United States Patent
Hiu et al.

(10) Patent No.: US 9,501,740 B2
(45) Date of Patent: Nov. 22, 2016

(54) PREDICTING WELL MARKERS FROM ARTIFICIAL NEURAL-NETWORK-PREDICTED LITHOSTRATIGRAPHIC FACIES

(71) Applicant: Saudi Arabian Oil Company, Dhahran (SA)

(72) Inventors: Martin D. Hiu, Dhahran (SA); Murtada I Al-Habib, Qateef (SA); Djamaludin Muhammad Mochtar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 385 days.

(21) Appl. No.: 14/294,979

(22) Filed: Jun. 3, 2014

(65) Prior Publication Data

US 2015/0347898 A1    Dec. 3, 2015

(51) Int. Cl.
  *G06F 15/18*   (2006.01)
  *G06N 3/08*    (2006.01)
  *G06N 3/06*    (2006.01)
  *G01V 99/00*   (2009.01)
  *G06N 3/04*    (2006.01)

(52) U.S. Cl.
  CPC ............ *G06N 3/08* (2013.01); *G01V 99/005* (2013.01); *G06N 3/06* (2013.01); *G06N 3/0436* (2013.01)

(58) Field of Classification Search
  None
  See application file for complete search history.

(56) References Cited

U.S. PATENT DOCUMENTS

| | | |
|---|---|---|
| 5,067,164 A | 11/1991 | Denker et al. |
| 5,251,286 A | 10/1993 | Wiener et al. |
| 5,444,619 A | 8/1995 | Hoskins et al. |
| 6,317,730 B1 | 11/2001 | Neuneier et al. |
| 6,374,185 B1 | 4/2002 | Taner et al. |
| 6,424,919 B1 | 7/2002 | Moran et al. |
| 7,280,987 B2 | 10/2007 | Chen et al. |

(Continued)

OTHER PUBLICATIONS

Shasmal et al. "Unconventional Reservoir Facies Modeling using Conventional Logs and Micro Resistivity Imaging Technique", Kochi, 2013, pp. 4.*

(Continued)

*Primary Examiner* — Li-Wu Chang
(74) *Attorney, Agent, or Firm* — Fish & Richardson P.C.

(57) ABSTRACT

This disclosure generally describes methods and systems, including computer-implemented methods, computer-program products, and computer systems, for predicting well markers. One computer-implemented method includes separating neural-network (NN)-predicted facies output associated with a plurality of wells into two sets, a first set of NN-predicted facies output of training wells and a second set of NN-predicted facies output of target wells, calculating, for each training well of the plurality of wells, a sameness score between zones of NN-predicted facies output and human-identified lithostratigraphic units (finer zones), calculating a mean sameness score for the finer zones for all training wells, identifying finer zones with a mean sameness score greater than a threshold value as dominant facies zones, and iterating over each target well to calculate a top and depth position of each dominant facies zone determined based upon the NN-predicted facies output of the target well.

20 Claims, 19 Drawing Sheets
(14 of 19 Drawing Sheet(s) Filed in Color)

(56) References Cited

U.S. PATENT DOCUMENTS

| | | | |
|---|---|---|---|
| 7,587,373 | B2 | 9/2009 | Smith, Jr. et al. |
| 7,613,665 | B2 | 11/2009 | Chen et al. |
| 7,814,036 | B2 | 10/2010 | Chen et al. |
| 8,090,538 | B2 | 1/2012 | Wilkinson et al. |
| 8,374,974 | B2 | 2/2013 | Chen et al. |
| 8,417,495 | B2 | 4/2013 | Dashevskiy |
| 8,510,242 | B2 | 8/2013 | Al-Fattah |
| 2004/0133531 | A1 | 7/2004 | Chen et al. |
| 2011/0099132 | A1 | 4/2011 | Fruehbauer et al. |
| 2012/0209526 | A1* | 8/2012 | Imhof .................. G01V 1/306 702/5 |
| 2012/0239361 | A1* | 9/2012 | Vargas-Guzman ..... G06T 17/05 703/6 |
| 2013/0080133 | A1 | 3/2013 | Sung et al. |
| 2013/0297272 | A1 | 11/2013 | Sung et al. |
| 2013/0318019 | A1 | 11/2013 | Jamison et al. |
| 2014/0149041 | A1 | 5/2014 | Sung et al. |

OTHER PUBLICATIONS

International Search Report and Written Opinion of the International Searching Authority issued in International Application No. PCT/US2015/032837 on Feb. 24, 2016; 12 pages.

Basu, T. et al.; "Facies Analysis: Integration of Core and Log Data using a Neural Network as Input for Reservoir Modeling in Betty Field, Malaysia"; Aug. 1, 2004; 4 pages. Retrieved from the Internet: http://library.seg.org/doi/pdf/10.1190/1.1786905.

Levenshtein, "Binary Codes Capable of Correcting Deletions, Insertions, and Reversals", Soviet Physics-Doklady, vol. 10, No. 8, Feb. 1966, pp. 707-710.

Wagner et al., "The String-to-String Correction Problem", Journal of the ACM vol. 21, No. 1, Jan. 1974, pp. 168-173.

Brodal et al., "A Linear Time Algorithm for the k Maximal Sums Problem", Mathematical Foundations of Computer Science, Published in 2007, 12 pages.

Druzdel, "Explanation in Probabilistic Systems: Is it Feasible? Will it Work?", Intelligent Information Systems V Proceedings, Jun. 2-5, 1996, 13 pages.

Stuart et al., "Artificial Intelligence: A Modern Approach", (3rd ed.), copyright 2010, Upper Saddle River, New Jersey: Prentice Hall, pp. 736-748.

Stanley, "Earth System History", published in 1999, New York: W.H. Freeman and Company. p. 134.

Fowler et al., "Dissolution/Precipitation Mechanisms for Diagenesis in Sedimentary Basins", J. Geophys. Res., vol. 108, No. B10, 2509, published in 2003, 14 pages.

Schlager, "Carbonate Sedimentology and Sequence Stratigraphy", SEPM, Copyright 2005, 7 pages.

\* cited by examiner

US 9,501,740 B2

PREDICTING WELL MARKERS FROM ARTIFICIAL NEURAL-NETWORK-PREDICTED LITHOSTRATIGRAPHIC FACIES

BACKGROUND

Surfaces that shape and bound a model of a reservoir, such as of petroleum, are constructed from data points known as well markers which are determined through a process known as well picking. Well markers can be used to characterize the reservoir in the sub-surface of the earth and to help geoscientists understand characteristics of the reservoir such as structure, orientation, plausible hydrocarbon entrapment scenarios, volume, depth location of the reservoir seal, and/or other characteristics. Well log data associated with drilled wells, such as gamma ray, neutron porosity and multiple resistivity logs, is manually interpreted by geoscientists and zones (lithostratigraphic units) are discerned along a well's trajectory. By identifying these zones for each well, the geologist places data points (well markers) marking the depth boundary of such zones. Identifying the zones in relation to an associated reservoir is based on a well-to-well correlation which requires thinking, knowledge, and experience; a time consuming process.

The well marker data can also form input data for three-dimensional (3D) petro-physical modeling application software used to create and bound surfaces of three-dimensional (3D)-reservoir models associated with the drilled wells. The traditional manual process of determining well markers is time consuming, costly, and it is not the best time investment for an expert geologist in a staff-constrained organization. Inaccurately marked wells and/or incorrect assumptions made due to lack of data to interpret can result in less-than-accurate 3D lithofacies models of reservoir formations and can cause wasteful expenditures of time and business resources and result in lost business opportunities and/or revenue.

SUMMARY

The present disclosure describes methods and systems, including computer-implemented methods, computer-program products, and computer systems, for predicting well markers according to an implementation. One computer-implemented method includes separating neural-network (NN)-predicted facies output associated with a plurality of wells into two sets, a first set of NN-predicted facies output of training wells and a second set of NN-predicted facies output of target wells, calculating, for each training well of the plurality of wells, a sameness score between zones of NN-predicted facies output and human-identified lithostratigraphic units (finer zones), calculating a mean sameness score for the finer zones for all training wells, identifying finer zones with a mean sameness score greater than a threshold value as dominant facies zones, and iterating over each target well to calculate a top and depth position of each dominant facies zone determined based upon the NN-predicted facies output of the target well.

Other implementations of this aspect include corresponding computer systems, apparatuses, and computer programs recorded on one or more computer-readable media/storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising, for the second set: grouping and stacking scattered interbedded facies into finer zones for target wells, and determining depth ratios of the finer zones following the grouping.

A second aspect, combinable with any of the previous aspects, further comprising: calculating a mean coverage score for the finer zones for all training wells, and calculating a mean of proportion ratio for finer zones for all training wells.

A third aspect, combinable with any of the previous aspects, further comprising, for finer zones with a mean sameness score less than or equal to the threshold value, grouping and stacking scattered interbedded facies into finer zones for target wells.

A fourth aspect, combinable with any of the previous aspects, further comprising: feeding dominant facies detection statistics aspects for target well zones and well markers prediction into a memory, and receiving dominant facies identified from the training wells and statistical characteristics of all finer zones in preparation for processing the target wells.

A fifth aspect, combinable with any of the previous aspects, further comprising calculating a sameness score and a coverage score between NN-predicted facies output and grouped and stacked finer zones for each target well, the grouped and stacked finer zones for each target well obeying the stacking order of finer zones corresponding to the training wells.

A sixth aspect, combinable with any of the previous aspects, further comprising moving a window of observation (WOO) to calculate a sameness score for each depth range associated with the NN-predicted facies output and grouped and stacked finer zones for each target well.

A seventh aspect, combinable with any of the previous aspects, further comprising determining the depth for remaining slots above, in-between, and below the calculated top and depth positions of each dominant facies zone for each target well.

An eighth aspect, combinable with any of the previous aspects, further comprising, filling in zones in available slots above, below, and in-between each dominant facies zone for each target well, the filling of the zones proportional to the determined depth ratios of the finer zones.

The subject matter described in this specification can be implemented in particular implementations so as to realize one or more of the following advantages. First, through an automated process, manual human participation is reduced and/or eliminated in the well-picking process, typically saving time and money. A geologist's time (and cost) is better spent analyzing/verifying predicted well markers and helping to improve the accuracy of the described automated process. With less manual steps performed by geologists, reservoir characterization efforts become more efficient both time and cost-wise. Second, the automated process can emulate, in a repeatable manner, a human capability to tolerate noise, inconsistencies of data, and to recognize underlying patterns when detecting a zone of interest. Third, apart from the oil and gas industry, the described techniques also have application in hydrogeology and geothermal exploration. Fourth, as a reservoir is further characterized and new wells are being drilled, the process can be employed in a real-time manner to determine the well markers of a well being drilled. Existing wells with logs, adjacent the new well being drilled can be used as training wells. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

"The patent or application file contains at least one drawing executed in color. Copies of this patent or patent application publication with color drawing(s) will be provided by the Patent and Trademark Office upon request and payment of the necessary fee."

Like reference numbers and designations in the various drawings indicate like elements.

DETAILED DESCRIPTION

Figure 1:
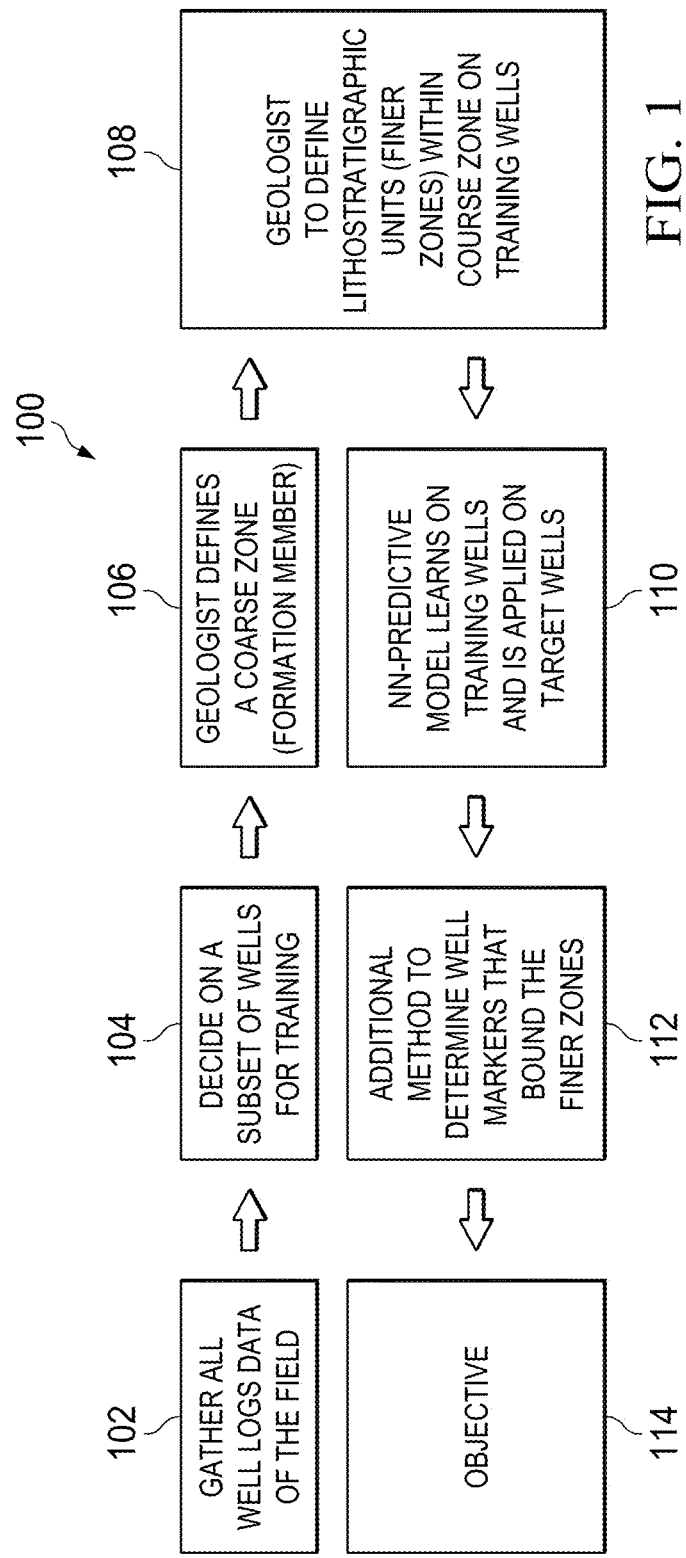
FIG. 1 illustrates a high-level method for predicting well markers according to an implementation.

This disclosure generally describes methods and systems, including computer-implemented methods, computer-program products, and computer systems, for predicting well markers. The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Traditionally, well log data is collected for each well of a group of wells, for example wells in a hydrocarbon bearing field, and manually interpreted by geoscientists to determine well markers. The well marker data is then used in the construction of a three-dimensional (3D) model of a reservoir associated with the group of wells.

At a high-level, methods and systems are described for reducing and/or eliminating manual human participation in the traditional, manually-performed well-marking process through the use of predicted lithostratigraphic facies to improve the efficiency of and reduce the cost of well marking. Artificial Intelligence through fuzzy pattern matching, statistics and principals of geology are encapsulated together into a systematic method. The methods and systems utilize an artificial neural-network (NN)-predictive method to predict facies from supplied well-log data. The NN-predictive method works by means of classification map (e.g., a self-organizing map). Mapping input of a training dataset (e.g., exemplary well logs) to a range of outcomes which represent a human decision when presented with the data presented by the training dataset. The NN-predictive method is then deployed on a majority of target wells to produce a rock facies prediction (an NN-outcome). Usually, the traditional process stops once the NN-predictive method completes the rock facies prediction and the facies prediction is used to construct the 3D reservoir model.

The present disclosure describes leveraging the NN-predictive-method facies prediction further; using the facies prediction to also predict well markers (e.g., top and base of the reservoir or the unit well markers). As such, a post-NN-prediction method is applied against the NN-outcome, in order to detect zones with predominant facies in all target wells and depth-locations of the zones (lithostratigraphic units) of the target wells after the deployment of data cleansing, outlier removal, index building and mapping process using the NN-predictive method. In some implementations, the post-NN-predictive method uses three unique statistical scores (e.g., a sameness score using an edit distance algorithm, coverage score, and/or ratio of depth). Typically, a sameness score is a score between 0-to-100 (lowest to highest) used to describe how similar two string patterns are, a coverage score is a score between 0-to-100 used to measure the degree of an element distribution within a population, and a depth ratio between segments of a path. For example: From A-to-C, one can stop at B. A ratio can be expressed by: distance between A-to-B over the distance between A-to-C AND distance between B-to-C over the distance between A-to-C. An example could be: coverage score of females in a country is a ratio of total number of females over the total number of population of the country. These three statistical scores are used to determine the best position of the predicted well markers for each dominant (explained in more detail below) facies zone.

FIG. 1 illustrates a high-level method 100 for predicting well markers according to an implementation. Method 100 may be performed by any suitable system, environment, software, and/or hardware, or a combination of systems, environments, software, and/or hardware as appropriate (e.g., the computer system described in FIG. 17 below). In some implementations, various steps of method 100 can be run in parallel, in combination, in loops, or in any order.

At 102, all well data is gathered (e.g., by a geoscientist). In some implementations, the well data is from well logs and includes gamma ray, neutron porosity, deep resistivity, intermediate resistivity, shallow resistivity, porosity density logs, and/or other data. From 102, method 100 proceeds to 104.

At 104, a group of wells is decided upon to be used for training data set. In some implementations, selection of training wells may include between ten and thirty percent of the overall wells where the remaining wells can each be a target of prediction (i.e., target wells). In some implementations, an orthographic map view of the wells in the field can help in the selection of wells that are part of the training wells. From 104, method 100 proceeds to 106.

Figure 2:
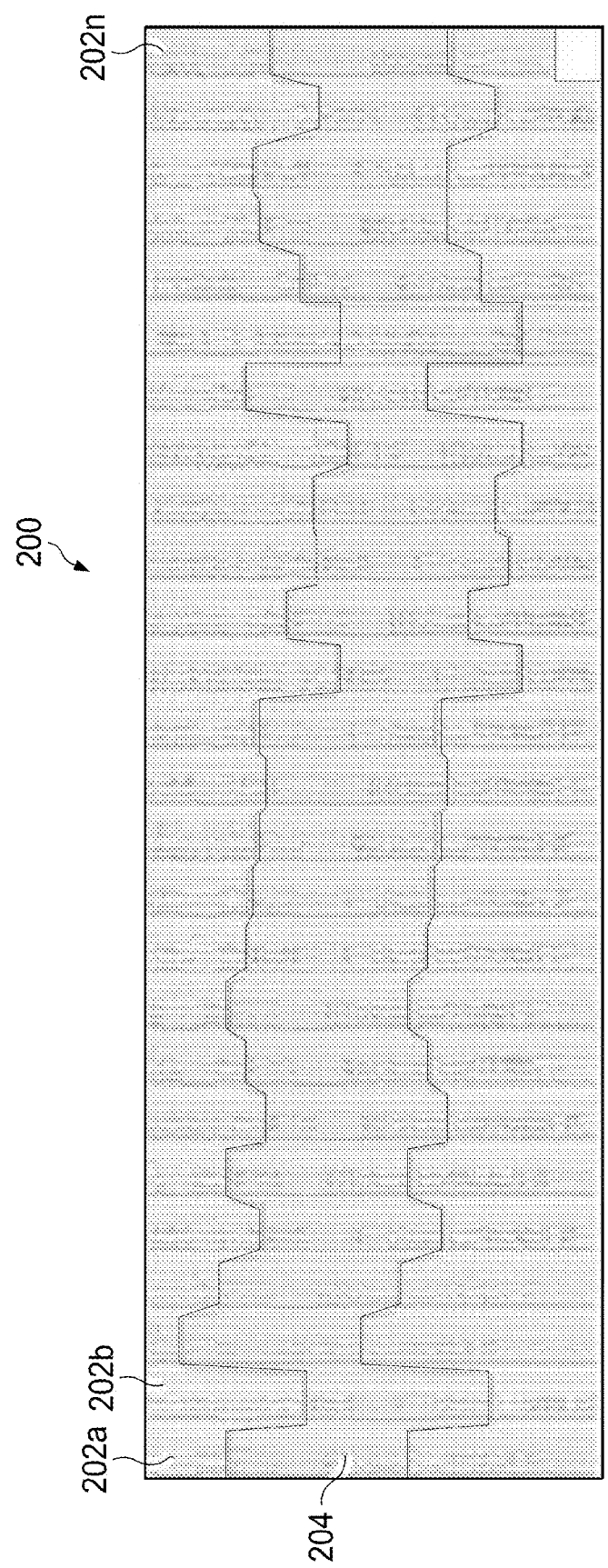
FIG. 2 illustrates well log data for multiple training wells arranged side-by-side according to an implementation.

At 106, a major interval of interest (coarse zone—equivalent to a formation such as geologic layers of limestone, sandstone, etc.) is marked representing a member of a formation or reservoir, for the application of NN-predictive method. FIG. 2 illustrates well log data 200 for multiple training wells arranged side-by-side according to an implementation. Each training well is represented by well log data (e.g., 202a, 202b, . . . , 202n). The coarse zone 204 is marked/indicated in some way. Within the coarse zone 204, there will be further subdivisions into multiple finer zones of interest representing other types of lithostratigraphic units. Returning to FIG. 1, from 106, method 100 proceeds to 108.

Figure 3:
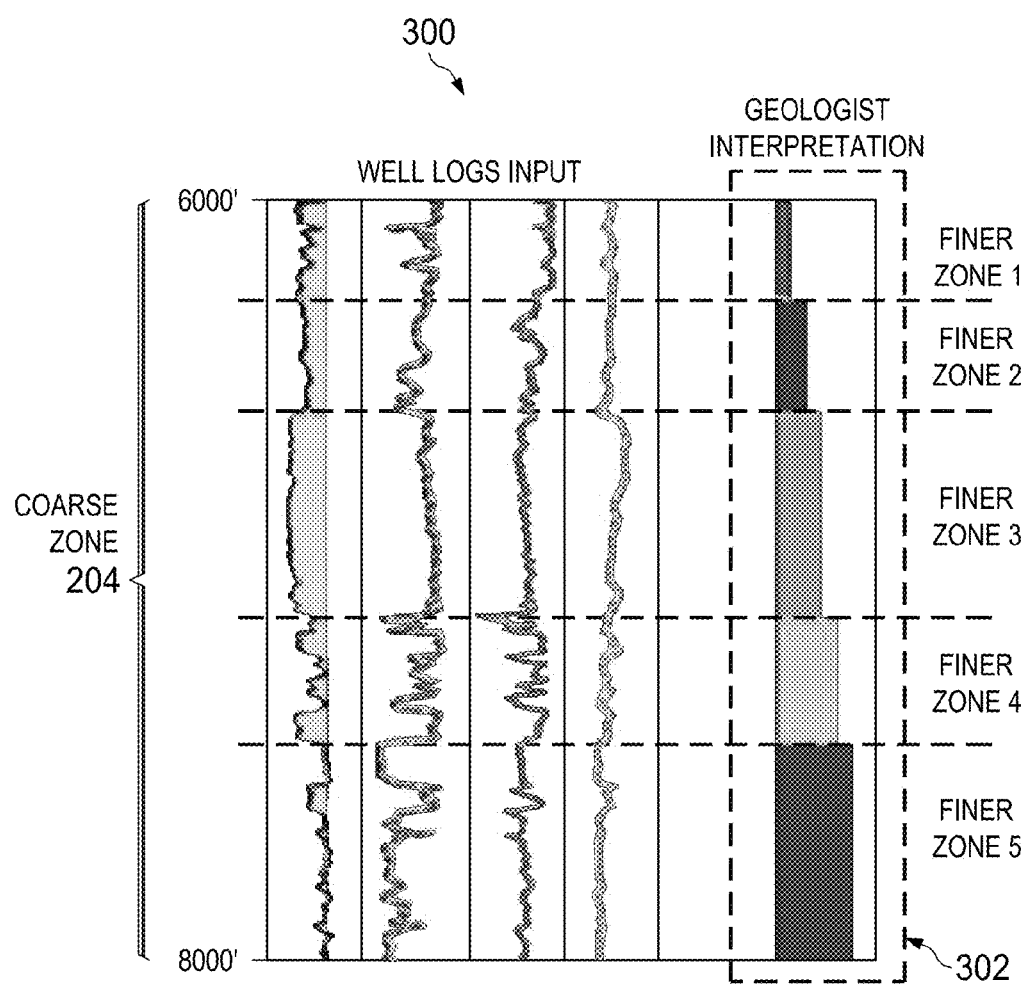
FIG. 3 illustrates an example of well log data curves for a single training well and an identified five finer zones that have been identified for the coarse zone of the training well according to an implementation.

At 108, finer lithostratigraphic units (finer zones) that are located within the identified coarse zone of 106 are identified by a human. In some instances, the finer zones can be characterized by the presence of a dominant lithology/facies. The recognition of these finer zones requires analysis of a collection of well log data that is available along the trajectory of the training wells. FIG. 3 illustrates an example of well log data curves 300 for a single training well and an identified five finer zones 302 that have been identified for the coarse zone 204 of the training well according to an implementation. Returning to FIG. 1, method 100 proceeds to 110.

Figure 4:
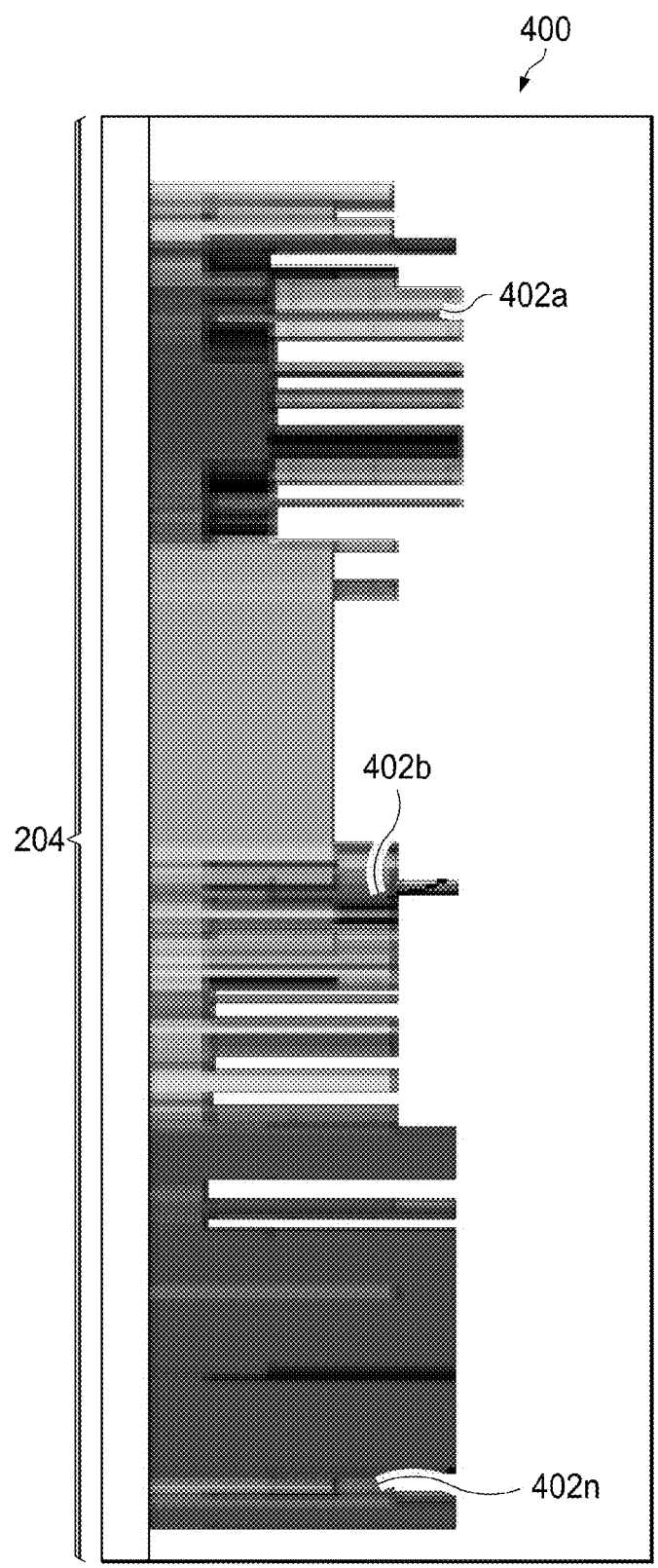
FIG. 4 illustrates an example of the outcome of an artificial neural-network (NN)-predictive method on a target well according to an implementation.

At 110, the NN-predictive method is furnished with well logs of the training wells and human-determined lithostratigraphic units (finer zones) are integrated into the same set of well log data for the training wells. The NN-predictive method is used to predict finer zone facies on target wells within the coarse zone 204. FIG. 4 illustrates an example of the outcome 400 of the NN-predictive method on a target well according to an implementation. Note the presence of interbedded facies 402a, 402b, . . . , 402n. Lithostratigraphic unit zone boundaries (i.e. well markers) are not easily identifiable from this raw facies output without additional method and processing. For example, 402a is a very heavily interbedded depth range, where a geologist has subdivided into 2 zones. Various rock-type overlies each other and a boundary between the 2 zones is not clear. 402n is dominantly one facies rock type. Other facies are found interbedded within the dominant facies. Returning to FIG. 1, from 110, method 100 proceeds to 112.

At 112, at a high-level, the NN-predicted facies output (NN-outcome) of 110 is supplied to a post-processing zone-prediction algorithm to identify well markers for target wells (remaining wells of 104 above that have not been processed).

a. Post-processing methods are applied to NN-predicted facies output associated with the target wells. In some implementations, post-processing methods includes at least the following, but are not limited to:

Grouping of similar facies together to represent a lithostratigraphic unit or zone-of-interest. Put the grouped facies into order to match the order of the zone-of-interest as a human has identified through well-logs analysis on the training wells.

Learn from human decisions on the training wells by forming a relationship(s) between his/her decision(s) on the location of the lithostratigraphic units (finer zones) and the facies output of the NN-predictive method. The learning process characterizes each finer zone (identified by a human) in terms of NN-predicted facies, through statistical aspects such as a degree of sameness, a coverage score of facies distribution, and a mean ratio-of-depth of the zones of interest. These statistical aspects from training data sets are used to guide and influence the post-processing method's behavior when determining the finer zones from the NN-predicted facies output of the target wells. Further outcome of the learning process is the recognition of the presence of dominant-facies zones.

In some instances, the strength of the NN-predictive-method presents problems in that prediction is too detailed for the purposes of predicting a start/stop of lithostratigraphic units or zones, and thus well markers. This is due to inclusion of minor facies that are almost always interbedded within a more dominate facies, obscuring where the zone starts and ends (as FIG. 4 illustrates at 402a and 402n). Minor facies are overlooked in order to see through the presence of a zone with a dominant similar rock facies and to cope with the intercalated/interbedded minor facies. In some instances, the NN-predictive method must also solve a depth boundary of zones with haphazard minor facies that show sign of no dominant facies.

Using the learning outcome to detect the depth location of finer zones with dominant-facies in target wells. For other zones without dominant facies, depth and range prediction utilize the depth ratio of facies which have been grouped together based on like-with-like grouping and stacked to match the lithostratigraphic units ordering as learned during the training process (note: the raw facies outcome of the NN-predictive method are not in order). In some implementations, the well markers that will be predicted for zones without dominant facies lay at a point equidistant between:

The ratio of zone depth after stacking and grouping, AND

The mean depth ratio of the wells of training dataset.

Figure 5:
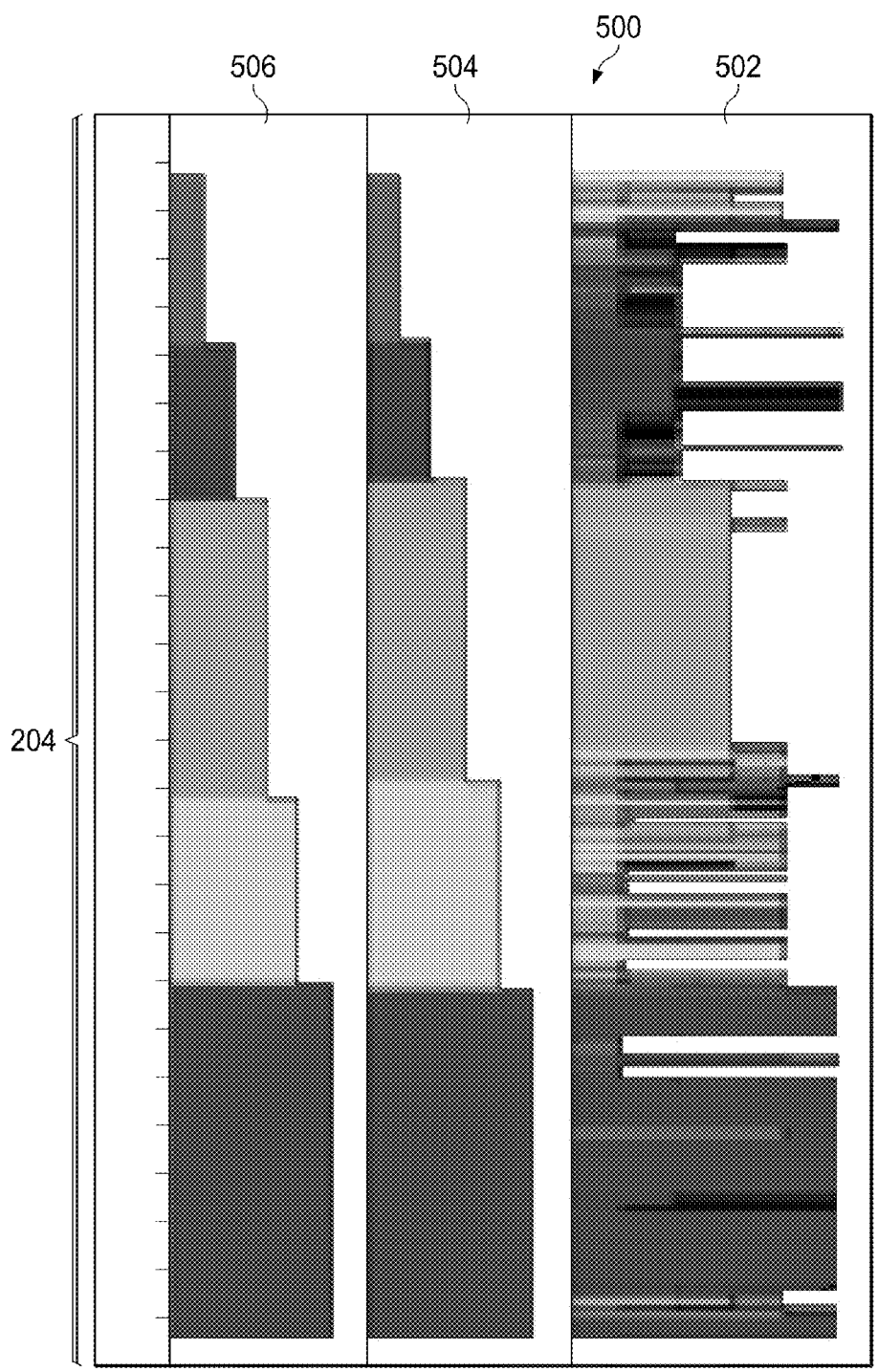
FIG. 5 illustrates various data sets associated with the described method for predicting well markers according to an implementation.

To apply a systematic identification of a zone showing a dominant facie. The systematic identification is, in some implementations, powered by a fuzzy comparator, able to tolerate interbedding of minor facies within a zone with a predominantly similar facies. In some implementations, the algorithm suitable for the identification of a dominant facies zone is an enhanced-Levenshtein edit distance algorithm. The algorithm is enhanced with the concept of coverage score to measure the degree of facie distribution within a finer zone or a window of observation of a certain depth range.

b) Summarize the lithostratigraphic units (finer zones) boundaries. Each zone gives the predicted depths (e.g., top and bottom depth bounding the zone). FIG. 5 illustrates example various data sets associated with the described method for predicting well markers. In the illustrated implementation from right to left: at 502, NN output before the processing using the present invention; at 504, a geologist identified zone of interest; at 506, output after application of post-processing methods on NN-predictive method output.

FIGS. 6A-6D illustrate a post-processing predicting method 600 (as four separate method flow charts 600a-600d) for performing post-processing steps against an NN-predictive method deployed on a majority of target wells to predict lithostratigraphic finer zones and well markers (e.g., described at a high-level in 112 above) according to an implementation. In other implementations, post-processing methods can include more or less post-processing methods (including one or more of the above and/or other post-processing methods) and in any order. Method 600 may be performed by any suitable system, environment, software, and/or hardware, or a combination of systems, environments, software, and/or hardware as appropriate (e.g., the computer system described in FIG. 17 below). In some implementations, various steps of method 600 can be run in parallel, in combination, in loops, or in any order.

Figure 6A:
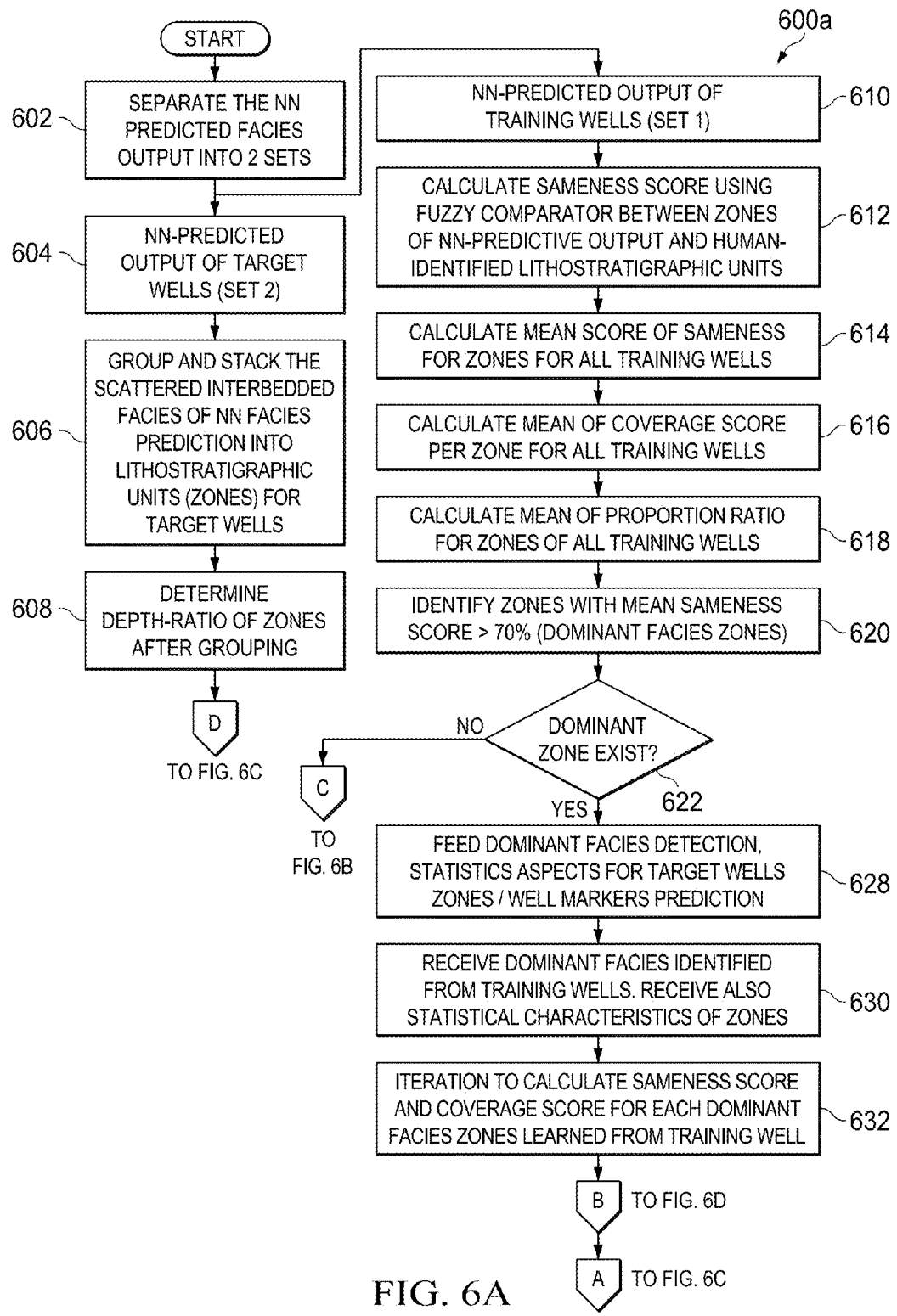
FIGS. 6A-6D illustrate a post-processing predicting method (as four separate method flow charts) for performing post-processing steps against an NN-predictive method deployed on a majority of target wells to predict lithostratigraphic finer zones and well markers according to an implementation.
Figure 6B:
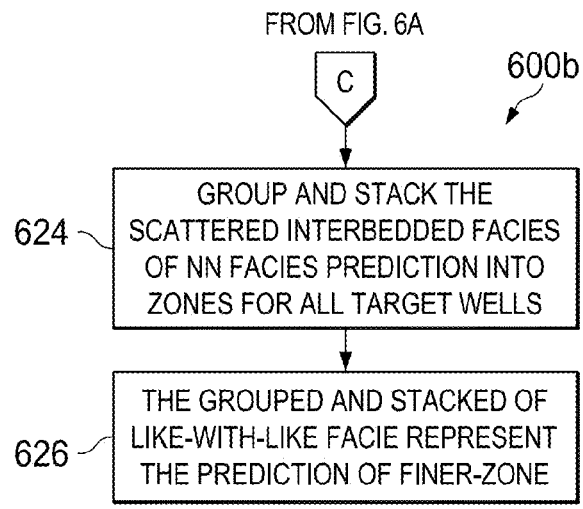
Figure 6C:
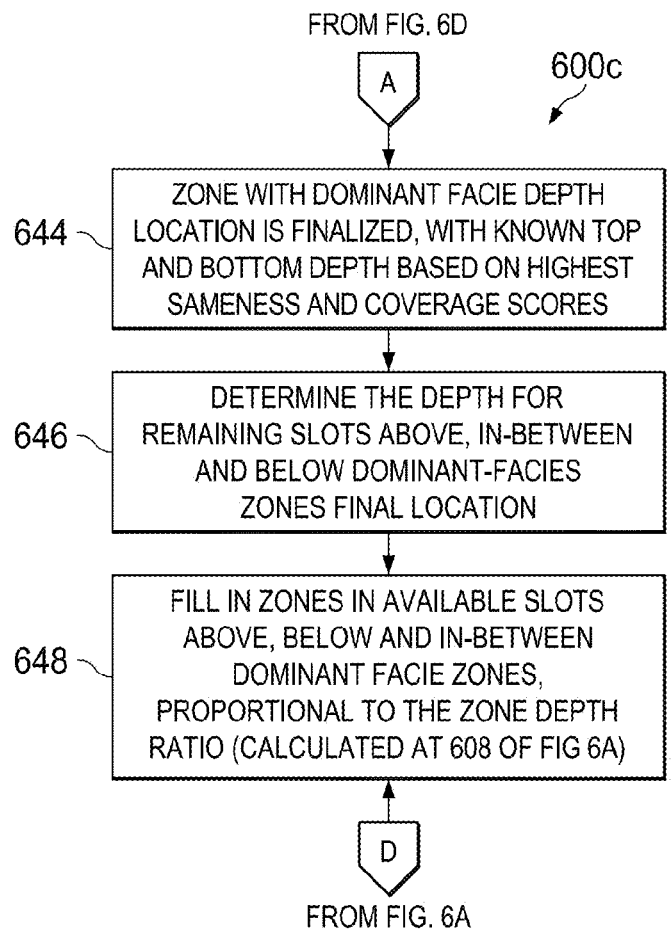
Figure 6D:
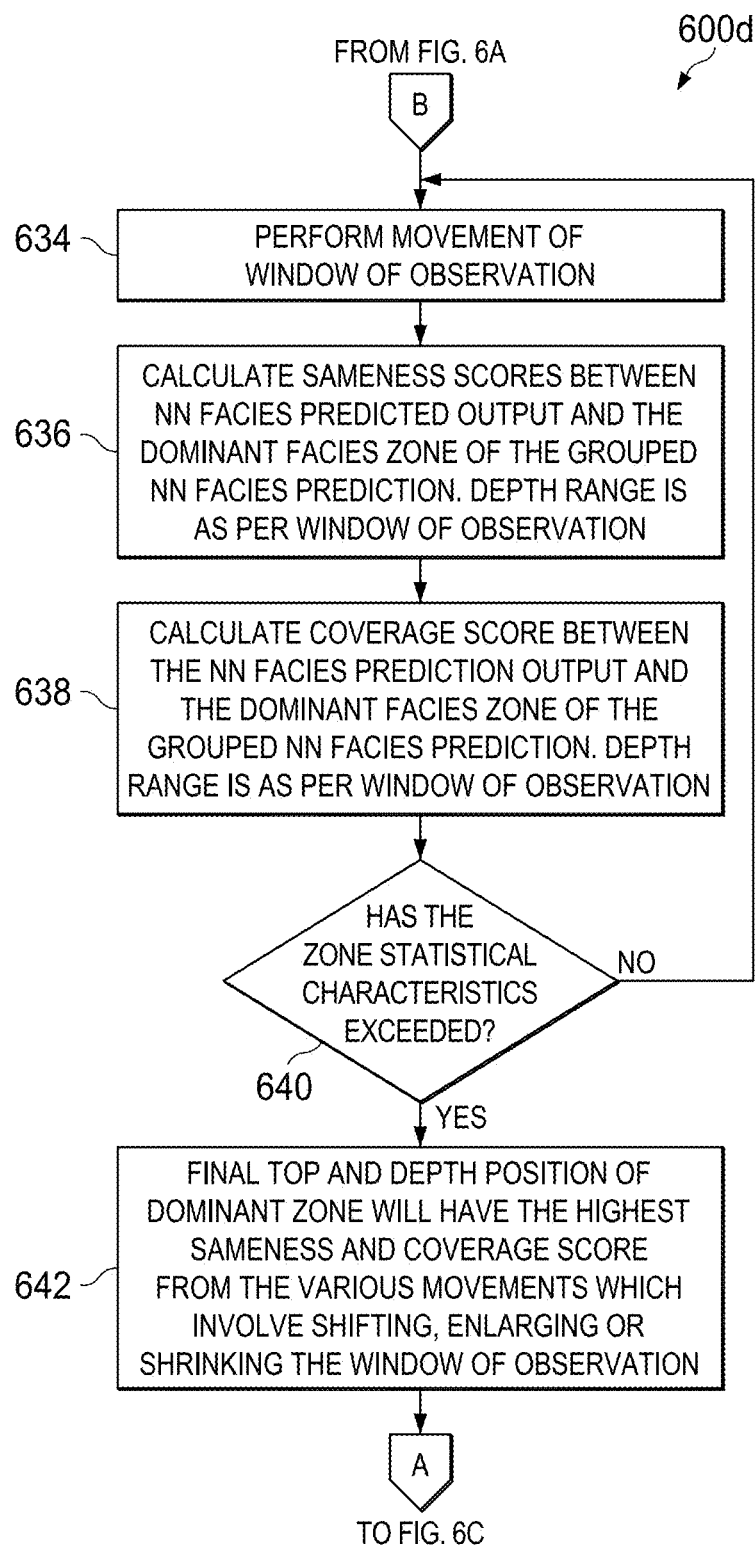

Turning to FIG. 6A, at 602, the NN-predicted facies are separated into two sets. The first set (SET 1—minor set) is the output from the training wells and the second set (SET 2—major set) is the output pertaining to target wells. From 602, method 600a proceeds to both of 604 and 610. In some implementations, at 604 and/or 610, the separated NN-predicted facies output data can be pre-processed prior to extraction of various statistics for each lithostratigraphic unit (finer zone) within a course zone (a member of a geologic formation). For example, the NN-predicted facies data can be converted into other formats, normalized, etc. From 604 and 610, method 600a proceeds to 606 and 612, respectively.

SET 1—Output from Training Wells

Together with prior work of the geologist on SET 1, various statistics are extracted for each lithostratigraphic unit (finer zone) within a course zone (member of a geological formation). In some implementations, statistics of interest are: 1). mean of the sameness score between the NN-predicted facies output and the finer-zone classified by the geologists; 2) mean of the ratio of depth for finer zones that all-together make up a coarse zone; and mean of the coverage score for a facie within the depth range of a finer-zone as determined by the geologist.

At 612, a sameness score is calculated using a fuzzy comparator between zones of NN-predictive facies output and human-identified lithostratigraphic units. In some implementations, the fuzzy comparator is an enhanced Levenstein-distance (edit-distance) algorithm. However there are other fuzzy-logic comparators, which could be deployed to produce the sameness score.

Figure 7:
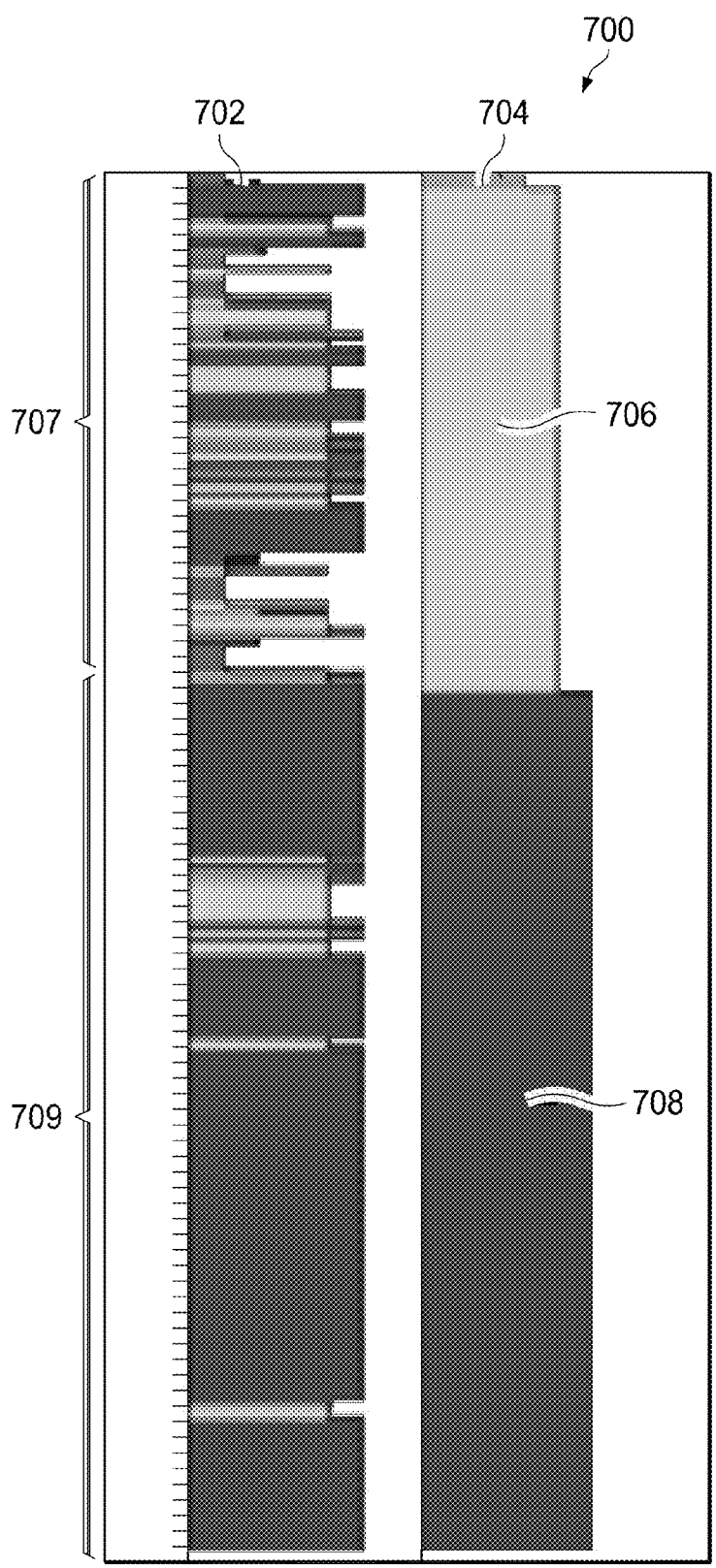
FIG. 7 is a graph illustrating a sameness score between two sets of data according to an implementation.

FIG. 7 is a graph 700 illustrating a sameness score between two sets of data according to an implementation. NN-predicted facies output 702 is graphed in comparison with two lithostratigraphic units (finer zones) 704 identified by a geoscientist (e.g., a geologist) from analysis of well logs.

The sameness score for the finer zone 706 (lime-color) would be very low (e.g., below 20%) when it is compared laterally within the same area of thickness 707 of the raw NN-predicted facies output 702. Whereas the sameness score for the red-colored lithostratigraphic unit 708 identified by the geoscientist, when compared with the NN-predicted facie of the same depth range 709 would score highly in terms of sameness (e.g., above 80%).

The process of computing the sameness score starts with an encoding step. The encoding is performed by conversion of the lateral slice of equal depth for the raw NN-predicted facies output 702 and also the geologist-determined lithostratigraphic unit (finer zone) (e.g., 706 and 707). In some implementations, at half-a-foot lengths, the facie is represented by a character/digit, any character/digit as long consistently used for the same representation. The entire lateral slice can therefore be encoded into consecutive string of characters. Each character represents a facie (e.g. red facie is represented by character '6,' a yellow facie is represented by character '5,' etc. This allows two consecutive string of characters (e.g., one from NN-predicted facies and the other from either a geoscientist identified finer zone OR a grouped-and-stacked facies described below) to be fed into the above-described fuzzy comparator. The fuzzy-comparator computes the sameness score by comparing the consecutive strings of characters. A 100% score means that two consecutive strings of characters are identical. Returning to FIG. 6, from 612, method 600a proceeds to 614.

At 614, the mean score of sameness for zones for all training wells is calculated. In other words, having calculated the sameness score, take the statistical mean for all the wells that are part of the training wells. From 614, method 600a proceeds to 616.

Figure 8:
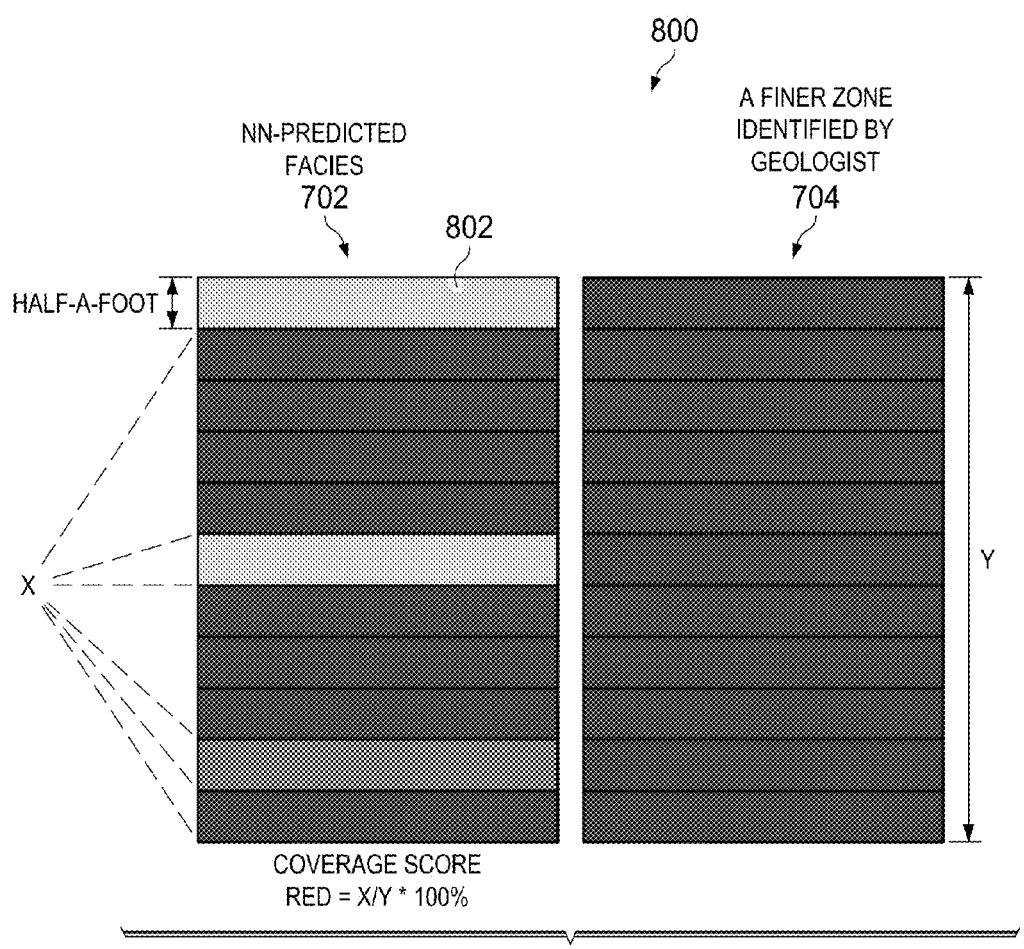
FIG. 8 is a graph illustrating how a coverage score is computed according to an implementation.

At 616, the mean of coverage score per zone for all training wells is calculated. The coverage score is computed by taking the ratio of identical facie count in NN-predicted facie output over either the same lateral thickness of the finer zone after grouping and stacking the NN-predicted facies output OR the geologist-identified finer zone. The mean coverage score is a metric to obtain the "feel" of the degree of similarity between two sets of values being compared. For example, if a NN-predicted red facies has a coverage score that is above mean, it provides an indication to the process that the movement of a window of observation (see 634) must stop. FIG. 8 is a graph 800 illustrating how a coverage score is computed according to an implementation. Each cell 802 is half-a-foot deep, in the left track: NN-predicted facie output over the same depth range as per lithostratigraphic unit (finer-zone) identified by the geologist, appearing on the right track. In the example of FIG. 8, for the lithostratigraphic unit finer zone (in red) 704, the zone on the right will represent 100% coverage, while the NN-predicted facie output 702 over the same depth range/thickness, the red facie will have a coverage score of 72.72%. Having calculated the coverage score for each well, take the statistical mean for all the wells that are part of the training wells. From 616, method 600a proceeds to 618.

Figure 9:
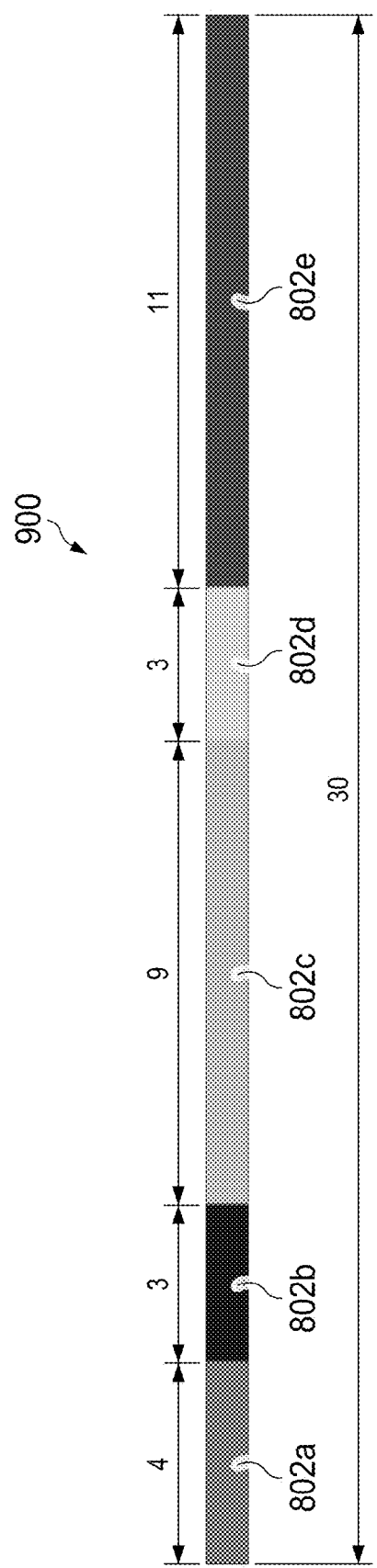
FIG. 9 is a graph illustrating the calculation of a depth ratio of a finer zone according to an implementation.

At 618, the mean of proportion ratio for zones of all training wells is calculated after all like-with-like coloredcoded-facies are grouped and stacked. In other words, having calculated the proportion of ratio of zones for each well, take the statistical mean for all the wells that are part of the training wells. Turning to FIG. 9, FIG. 9 is a graph illustrating the calculation of a depth ratio of a finer zone according to an implementation. Each depth ratio is calculated by taking the mentioned depth over the depth of all finer-zones (i.e. pink, blue, green, lime-green and red—802*a*-802*e*, respectively). For example, the pink colored finer-zone has a zone depth of 4, therefore the depth-ratio of the pink facies zone is 0.13. Returning to FIG. 6, from 618, method 600*a* proceeds to 620.

At 620, zones with mean sameness score greater than seventy percent (70%) are identified by iterating through all finer zones and identifying zones with a mean sameness score greater than 70%. The statistical mean of the sameness scores for finer-zones existing in the training well will allow an automatic detection of lithostratigraphic unit (finer zone) containing dominant facie in the target wells. An implementation of the present invention, suggests that the lithostratigraphic unit mean sameness score not lower than 70% is effective in automatically detecting if an observed zone in a target well has dominant facies within the observed zone (this emulates a human's capability to glance and determine a predominant color). The identified finer zones with a mean sameness score greater than 70% are therefore considered to be those containing dominant facies. In other implementations, the mean sameness score to be considered a dominant facies zone can be either higher than, lower than, and/or equal to seventy percent. In some implementations, this threshold can be implemented as a configurable parameter. From 620, method 600*a* proceeds to 622.

At 622, a determination of whether dominant facies zones exist is made. If it is determined that dominant facies zones are considered to exist, method 600*a* proceeds to 628. If, however, dominant facies zones are determined not to exist, method 600*a* proceeds to 624 of method 600*b* illustrated in FIG. 6B.

At 628, feed dominant facies detection statistics aspects for target well zones and/or well markers prediction into a memory. Statistics and results learned from training wells are stored in memory-stored-variables as the training wells are analyzed or learned. These variables are accessible in the embodiment program, when performing the iteration (at box 632) for the target wells. These memory-stored-variables can be, for example, which are the finer zones containing dominant facies as learned from the training wells?, what is the mean coverage score/sameness score for each zone that contains the dominant facies as has been determined by box 612 to 618, etc. In other words, by characterizing the NN-predicted facies output of the training wells (through extraction of statistical information and correlating them with human-injected knowledge on the zones (e.g., 612-620 described above)), the method 600 arms itself with sufficient information, which is used as a guide to explore the target wells and to predict the depth location of finer-zones, thus well markers. In some implementations, this information can be stored in particular storage locations, normalized, converted, etc. for future use. From 628, method 600*a* proceeds to 630.

At 630, dominant facies identified from training wells and/or statistical characteristics of all finer zones (e.g., mean sameness score, coverage score, and/or depth ratio of zones) are received (e.g., accessed from memory) in preparation of processing the target wells. For example, after examining ten percent of the total population of wells, it is determined that zones that are colored green and red contain dominant facies. For each color (i.e., a finer zone), store also in the memory-accessible-variables the mean sameness score, coverage score, depth-ratio. The statistical mean is pulled out from the ten percent of the well population that represents training wells. Once in the memory, the statistical information of the training wells can be accessed from other parts of the implementation. From 630, method 600*a* proceeds to 632.

At 632, an iteration is performed for each well in the target well population to calculate a sameness score and coverage score for each dominant facies zone learned from a training well. For target wells, NN finer zones prediction of each well would have completed grouping (like-with-like) and stacking-obeying ordering of finer zones as learned from training wells. At 632, each well in the target well population is iterated over (not the training wells). The target wells would have completed steps described in 606, 608. 606 performs grouping and stacking of like-with-like facies. This grouping will represent the first position of the window of observation (see 634) for a facies, when performing the method describe in FIG. 6D. From 632, method 600*a* proceeds to 634 of method 600*d* illustrated in FIG. 6D.

Figure 10:
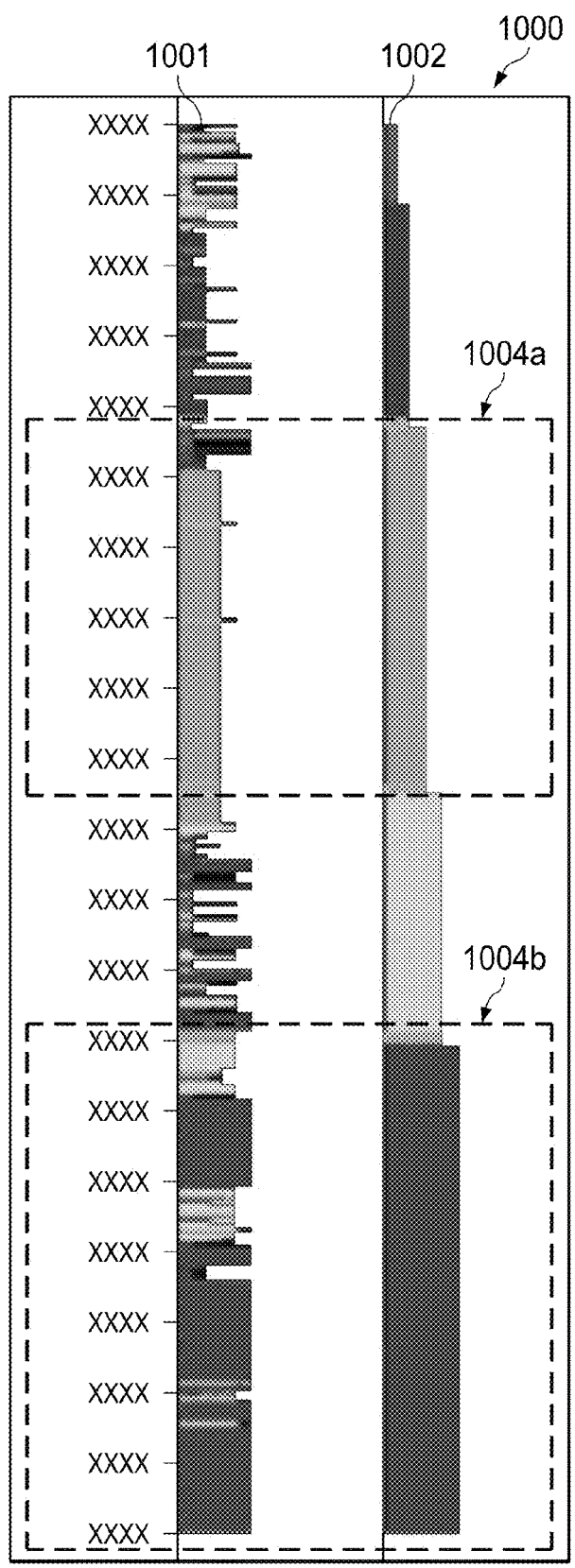
FIG. 10 illustrates a graph with an ungrouped/unsorted NN-predicted facie output and grouped/sorted facies of the same color according to an implementation.

At 634, the depth range of the finer zone that represents a window of observation is established by moving the window of observation. Turning now to FIG. 10, FIG. 10 illustrates a graph 1000 with an ungrouped/unsorted NN-predicted facie output of a set 2 target wells 1001 and grouped/sorted facies of the same color 1002 of target wells (the NN was run against the target wells also, so ungrouped/unsorted NN-facies output for target wells is available) according to an implementation obeying the order of finer zones as learned from the training wells (e.g., 704 of FIG. 7). For example, red, blue, green, etc. facie are grouped together. Note that each "XXXX" indicates a particular different underground depth (see also FIGS. 11 and 16). To locate accurate well markers (i.e., starting and ending depths) of a dominant-facie zone within the target wells, given the raw NN-predicted facie output 1001, a series of "movements" are made to one or more windows of observation (WOO) covering a certain depth range of the data. For each movement some metrics are calculated (described further below in 636 and 638). A WOO is employed on a finer-zone that has been detected to contain dominant facie. For example: if the system learns that there are two zones with dominant facies, then two WOOs will be used to do the iteration of movement, for each zone. A typical embodiment performs sequential iteration, however, in a parallel processing implementation; multiple WOOs could be iterated simultaneously. Note that a window of observation is just a range to compare two-tracks, first being the unsorted and ungrouped NN-facies output with the second which has been grouped and sorted, as if observing a minute object under a microscope—the view under the microscope can be thought of as a WOO. Panning the view to observe more of the minute object represents the iterative movement of the WOO.

In some implementations, as a starting point of the iterative moves, the method 600*d* relies on a depth-range of the zones (a result of stacking and grouping of like-with-like facies) as the initial window of observation (an estimated starting location before iterative movement of the WOOs—see the positions of 1004*a/b* in FIG. 10). As a result of facies sorting and grouping of the NN-predicted facies output 1001, an estimated depth position of the two dominant zones can be determined. These positions serve as the starting location for the iterative move and measure. At the same depth positions, bounded by the WOOs 1004*a* and 1004*b*, the sameness score is calculated for the NN-predicted facies output against its lateral counterpart appearing on the right hand side track 1002. The unprocessed NN-predicted facie output 1001 is being observed and compared to the grouped and stacked data 1002 within the same depth range of the observation window 1004*a*/b. Note that the observation window depth range can initially be kept constant and be followed by a resize through enlargement and shrinkage by a delta depth parameter. The window of observation is moved up or down incrementally by this delta parameter (in a series of iterative movements traversing the raw NN-predicted facies output), in order to determine an accurate location for one or more dominant-facies zones by calculating the highest sameness, coverage scores, and/or other scores. In some implementations, the iteration can stop when the calculated metrics are no longer in agreement with the mean statistical properties of the zone being observed, as learned from the training wells (refer to 640 below). While the WOO is being moved up or down, sameness and coverage scores are computed. Returning to FIG. 6, from 634, method 600*d* proceeds to 636.

Figure 11:
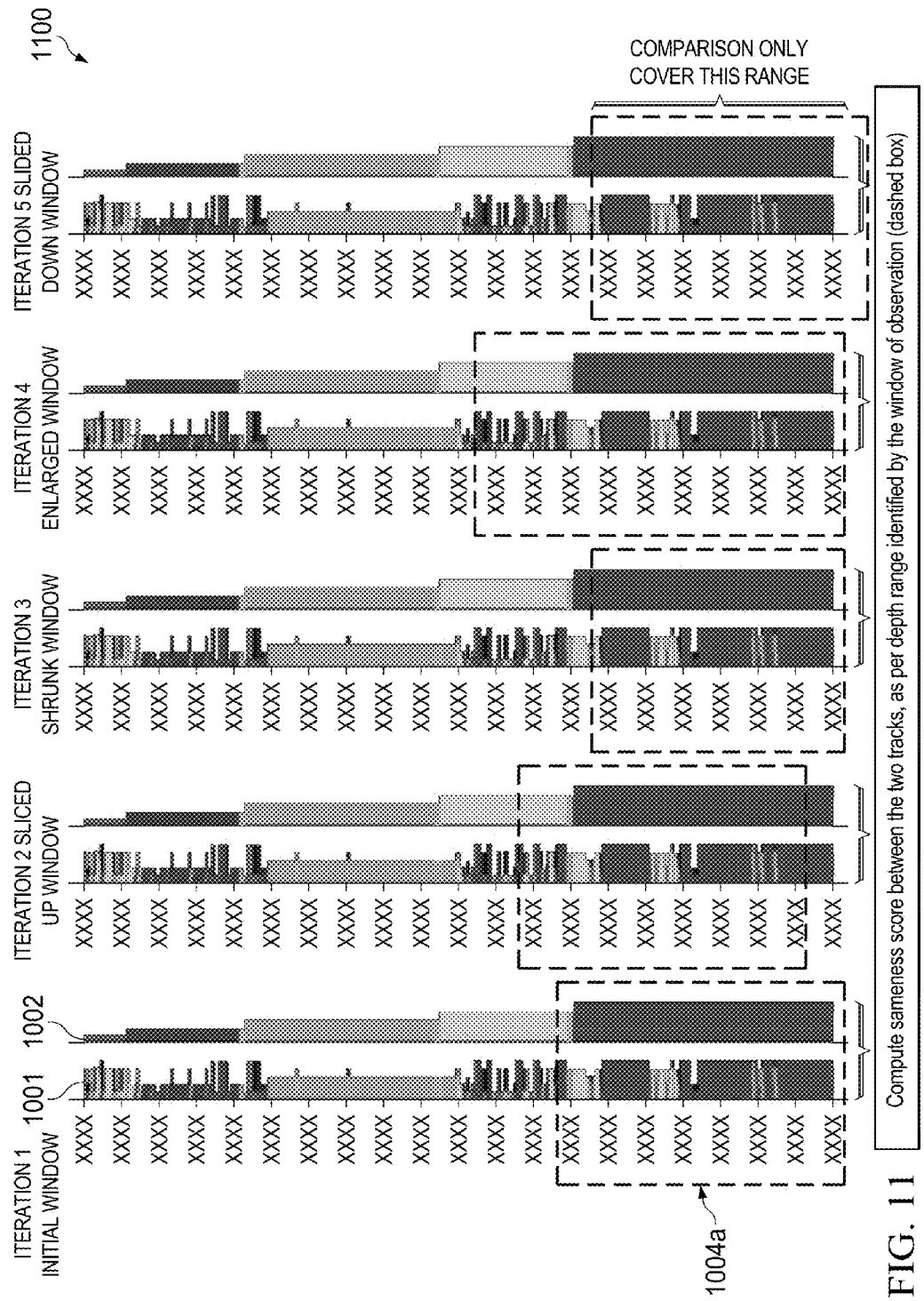
FIG. 11 is a graph illustrating iterative movements of a window of observation (WOO) according to an implementation.

At 636, sameness scores between NN facies predicted output and the dominant facies zone of the grouped NN facies prediction are calculated. For the depth range covered by the WOO, compute the sameness score (e.g., using the Levenshtein Edit distance algorithm). FIG. 11 is a graph 1100 illustrating iterative movements of a WOO 1004*a* according to an implementation. A sameness score is computed between the two tracks 1001 and 1002 as described above, as per depth range identified by the WOO 1004*a*. Each successive graph illustrates an iteration. When sliding up or down, each iteration will slide the WOO 1004*a* by a parameterized depth (e.g. +/−X feet). The same applies for shrinking or enlarging of the WOO 1004*a*. A number of iterations can be a system input parameter, an example of which is to have the system input parameter control to stop iterative movement of the WOO upwards or downwards to the percentage depth of the stacked and grouped facie of the zone. Each iteration moves the WOO by a delta. Other conditions that will stop the iteration can be if the iteration has reached or exceeded the shallowest-top and the deepest-bottom of the coarse zone. The mean coverage score is a metric to obtain the "feel" of the degree of similarity between two sets of values being compared. For example, if a NN-predicted red facies has a coverage score that is above mean, it provides an indication to the process that the movement of a window of observation (see 634) must stop. 640 embodies the termination of iteration described above and when the coverage score of the iteration has exceeded the statistical mean of coverage score of the corresponding zone with dominant facie. The condition "has the zone statistical characteristics exceeded?" ensures that iteration of movement would stop when the mean statistical metric has been exceeded. Returning to FIG. 6D, from 636, method 600*d* proceeds 638.

At 638, similar to the calculation of the sameness score in 636, a coverage score between the NN-predicted facies output and the dominant facies zone of the grouped NN facies prediction is calculated. A depth range is as per WOO. For the depth range covered by the WOO, compute the coverage score. Note that the coverage score computed for a WOO cannot exceed the statistical mean learned in 616 of FIG. 6A. The best coverage score is the one nearest the mean coverage score and will determine the iteration end of the movement of the WOO. From 628, method 600*d* proceeds to 640.

At 640, a determination is made whether the zone statistical characteristics have been exceeded (a condition). If it is determined that the zone statistical characteristics have been exceeded, method 600*d* proceeds to 642. If, however, it is determined that the zone statistical characteristics have not been exceeded, method 600*d* proceeds to 634.

In some implementations, the determination is made among all sameness scores and coverage scores calculated for each iteration moving the WOO (e.g., WOO 1004*a*). In some implementations, the tested condition for each iteration can represented by the following pseudocode:

```
IF ( iteration sameness score + coverage score ) < ( Facies mean sameness
   score + coverage score) THEN
   Continue to examine the scores for other iterations
ELSE
   The iteration that produces the maximum total score of sameness and
   coverage score that is greater than the statistical mean. The highest
   iteration score determines the best position of windows of
   observation.
END
```

An example of pseudocode application results could be as follows in Table 1:

TABLE 1

| Iteration (Movement) | Iteration Score | Facies Mean Score |
|---|---|---|
| 1 (initial position) | 145 | 150 |
| 2 (sliding up) | 152 | 150 |
| 3 (sliding down) | 140 | 150 |
| 4 (shrinkage by X feet) | 100 | 150 |
| 5 (enlarged by X feet) | 155 | 150 |
| No ## - repeat 2 to 5 by 2X feet etc. | — | — |

At 642, a final top and depth position of a dominant zone is determined as positions having the highest sameness and coverage score from the various movements of the WOO which involve shifting, enlarging, or shrinking the window of observation. In some implementations, the optimum position of the WOO is when the iteration score exceeds the facies mean score and is the highest score. In some implementations, the optimum iteration is to enlarge the WOO by X feet (e.g., half X feet at top end and half X feet at bottom end of WOO). As the initial depth position for the facies prior to iteration is known, as is the best iteration points to decide to enlarge the WOO by X feet, the start and end for a predicted facies can be calculated. From 642, method 600*d* proceeds to 644 of method 600*c* illustrated in FIG. 6C.

Figure 12:
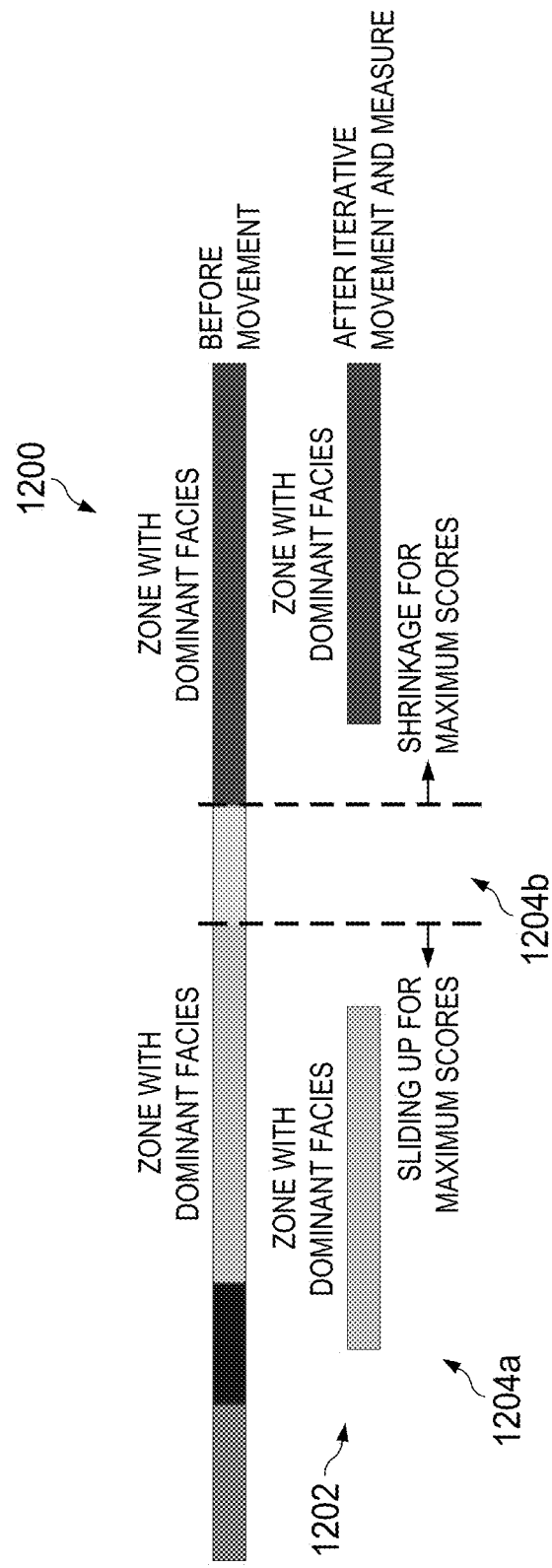
FIG. 12 illustrates a predicted depth position for grouped and stacked facies of the raw NN-predicted facie output that will produce the best iteration score according to an implementation.

At 644, a zone with dominant facie depth is finalized with a known top and bottom depth based on a highest sameness and coverage score. Note that, in some implementations, 644-648 are applied for all finer zones that have been identified to have dominant facies (identified above in 620). Referring to FIG. 12, FIG. 12 illustrates a predicted depth position 1200 for grouped and stacked facies of the raw NN-predicted facie output (here illustrated as red and green) that will produce the best iteration score according to an implementation. Bottom track 1202 illustrates the final estimated location of the dominant-facies zones after incremental movements and resize. The sameness and coverage score is calculated for the new position as a result of each movement. Notice that gaps 1204*a* and 1204*b* (blank areas) exist on the bottom track 1202, in between and above the predicted locations for dominant-facies zones (note: it is also possible to have gap below zone of dominant facies as well). From 644 method 600*c* proceeds to 646.

Figure 13:
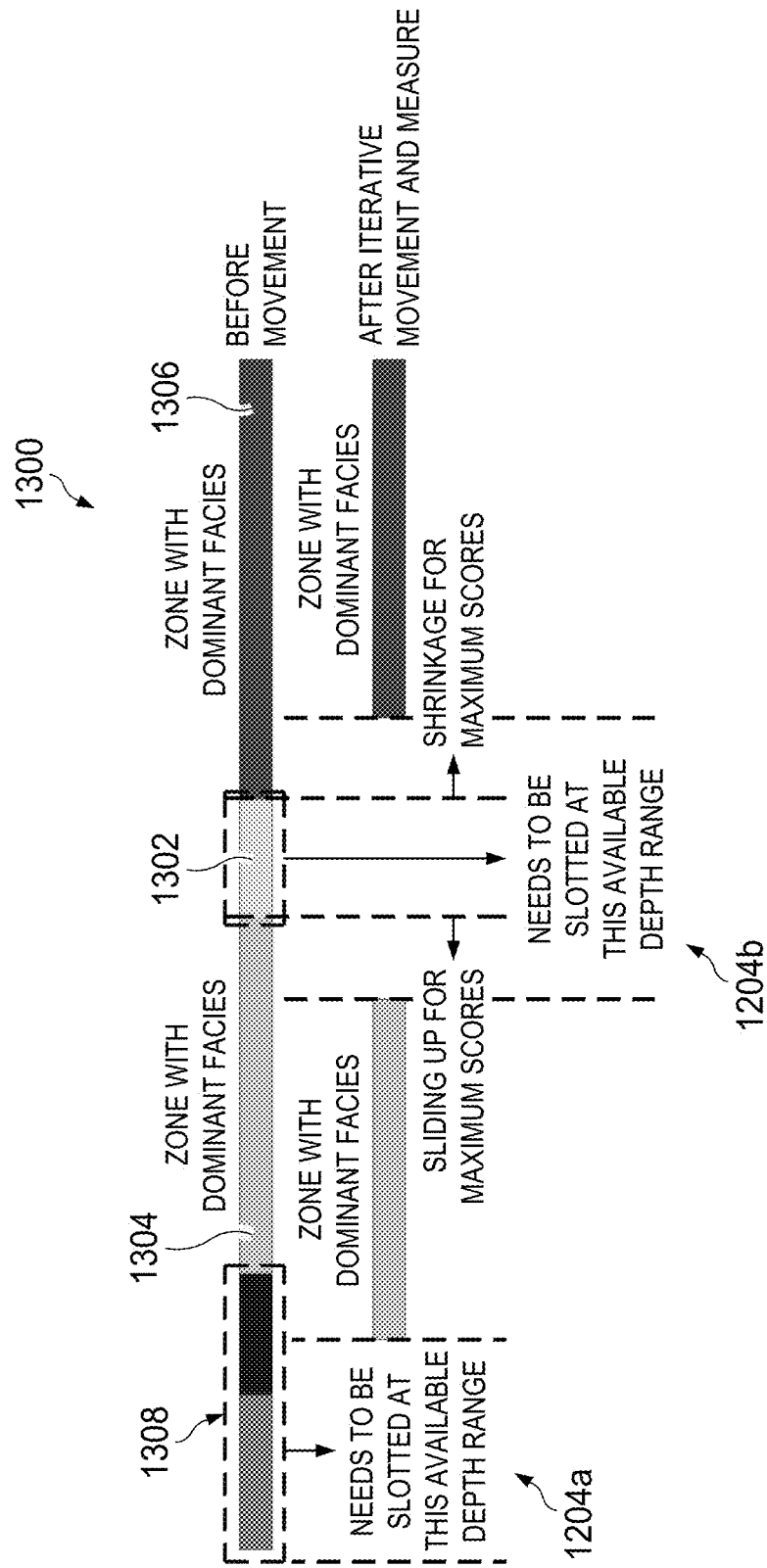
FIG. 13 illustrates gaps to be filled in above and in-between finer zones position in relation to dominant facies according to an implementation.

At 646, the depth for remaining slots above, in-between, or below dominant-facies zones determined final location is determined. Note that at this stage, the finer zone with dominant facies depth position has been predicted. Referring to FIG. 13, FIG. 13 illustrates gaps 1300 to be filled in above and in-between finer zones position in relation to dominant facies according to an implementation. The length of the depth range for available slots is determined. From 646, method 600c proceeds to 648.

At 648, zones in available slots above, below, and in-between dominant facie zones are filled in, proportional from the zone depth ratio as calculated at 608 of method 600a. In some implementations, a simple strategy is adopted to fill in available slots. For example, if the slot is only to fit in one finer zone then the entire slot can be populated with that finer zone. In FIG. 13, finer zone 1302 can occupy the entire depth range between the green and red (1304 and 1306, respectively) finer zones facies.

Figure 14:
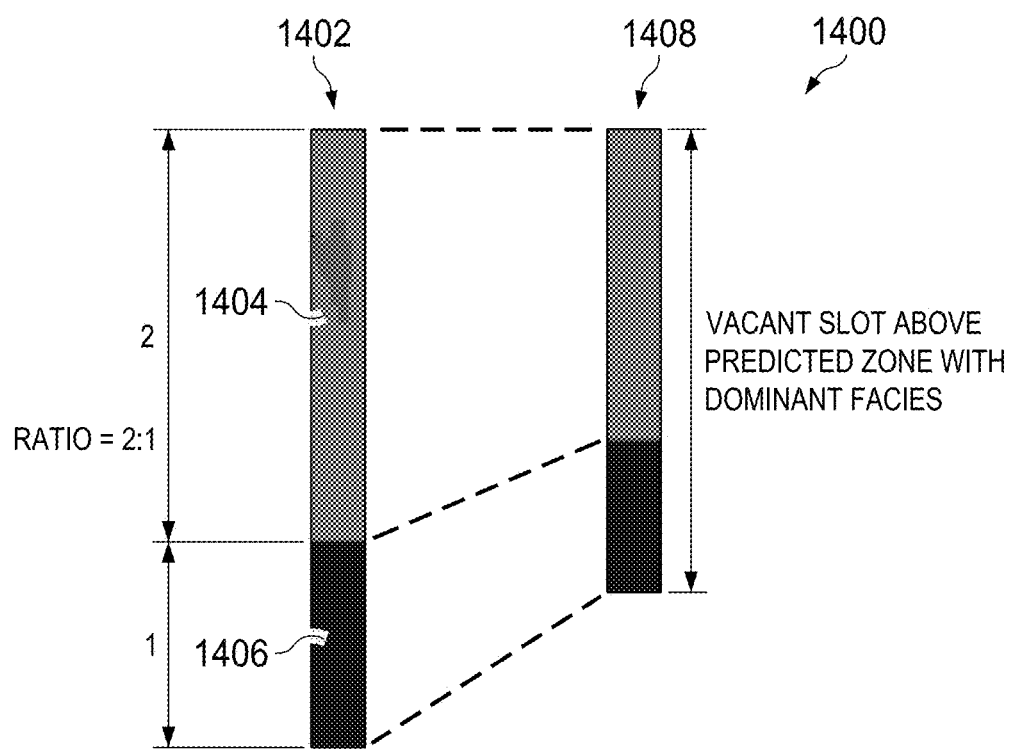
FIG. 14 illustrates the use of a ratio-of-depth method to apportion a predicted stacked and grouped NN-predicted facies output according to an implementation.

In the case where available slots need to fit more than one finer zone facies, such as the slots (collectively 1308) above the green finer facies 1304, the proportion of the depth range for the illustrated pink and blue finer facies (in slot 1308) needs to be calculated to fit into the available slot 1308. One possible implementation is to follow a ratio of depth of the zones after stacking and grouping of like-with-like facies. FIG. 14 illustrates the use of a ratio-of-depth method 1400 to apportion a predicted stacked and grouped NN-predicted facies output according to an implementation. As illustrated, left track 1402 shows the original stacked and grouped NN-predicted facies output for two zones, prior to determination of accurate position of zones with dominant facie. The method calculates the ratio of pink zone 1404 and blue zone 1406 is 2:1. The right track 1408 shows vacant slot that remains above a dominant zone (e.g., 1308 above 1304 of FIG. 13) which has been predicted. The available gap (e.g. 1308) is apportioned into the same 2:1 ratio to accommodate the pink zone 1404 and blue zone 1406. From 648, method 600c stops.

At 624, the scattered, interbedded facies of NN-predicted facies are grouped and stacked into zones for all target wells. Here, a dominant facie cannot be found in the finer zones observed in training wells (see 622). This means that the best prediction that the post-processing method can do is to group and stack like-with-like together for all NN-predicted facies in all target wells. In the situation that none of finer zones contain dominant facies, the finer zones prediction that this method could predict will simply rely on grouping like-with-like facies together. From 624, method 600b proceeds to 626.

At 626, the grouped and stacked like-with-like facie are considered to represent the prediction of a finer zone. The post-processing method learns from the NN-predicted-facies. The objective is to find dominant facies contained within finer zones being learned (see 620). However, there is no guarantee that dominant facie exist in a finer zone. In the event that there is no dominant facie detected within any of the finer zones learned in training wells, to predict the well markers in the target wells, the best prediction of well-markers will be based on the grouped and stacked of like-with-like facie and to find out the depth position of each finer zone. After 626, method 600b stops.

SET 2—Output for Target Wells

At 606, the scattered interbedded facies of NN facies prediction are grouped and stacked into lithostratigraphic units (zones) for target wells. As illustrated in FIG. 3, each finer zone is represented by a different color. Note that each finer zone can also, but not necessarily, contain multiple rock facies found interbedded within a dominant one. When the finer zone is identified by a geoscientist, the identification process can deliberately overlook minor rock facies which may have been found interbedded together with a dominant rock facie within a finer zone. A geoscientist can do so, because a human has the ability to generalize and can spatially correlate information of one well with some other wells within a field of study. They can decide if the minor facies inclusion is just an aberration of nature on a well, being interpreted or in fact, the minor facies persists laterally across the field, which means that it merits to be considered as a distinct finer zone. In short, a geoscientist has their own reason to believe why certain minor rock facies inclusion(s) should be considered as part of a finer zone the geoscientist has decided to delineate. Regardless of their reasoning, the described method should be able to predict reasonably accurately top and bottom depth markers of finer zones. Having provided the NN with well logs and human interpretation (knowledge) of a sub-set of wells (e.g., training wells), the NN can be applied to other wells that are not part of the training (e.g., target wells). This means that wells being applied have not had finer zones interpreted by the geoscientist. Only well logs of target wells are available as input to the NN prediction.

Figure 15:
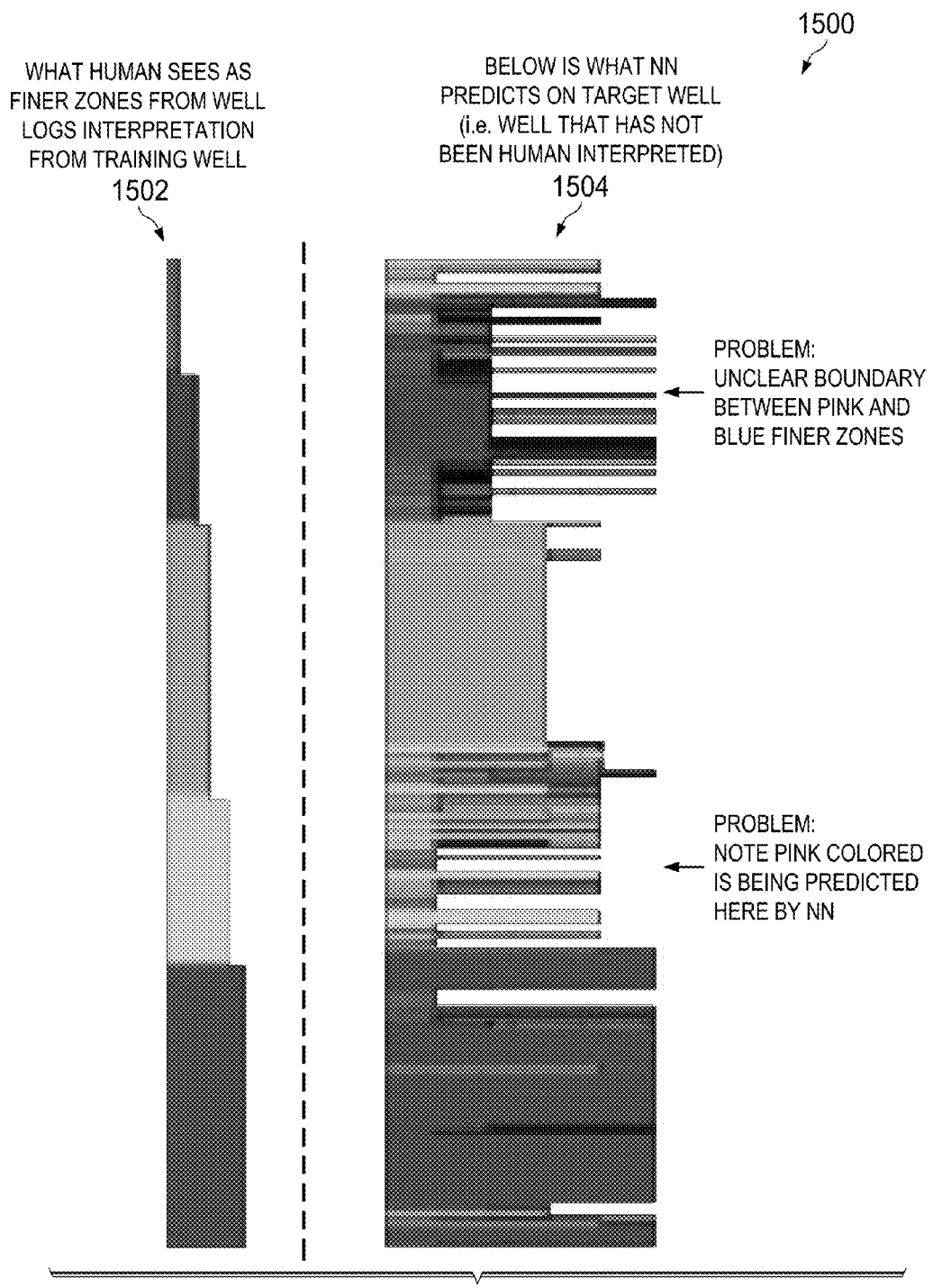
FIG. 15 illustrates the difference between a human prediction from well logs of training wells and NN-predicted facies of a target well according to an implementation.
Figure 16:
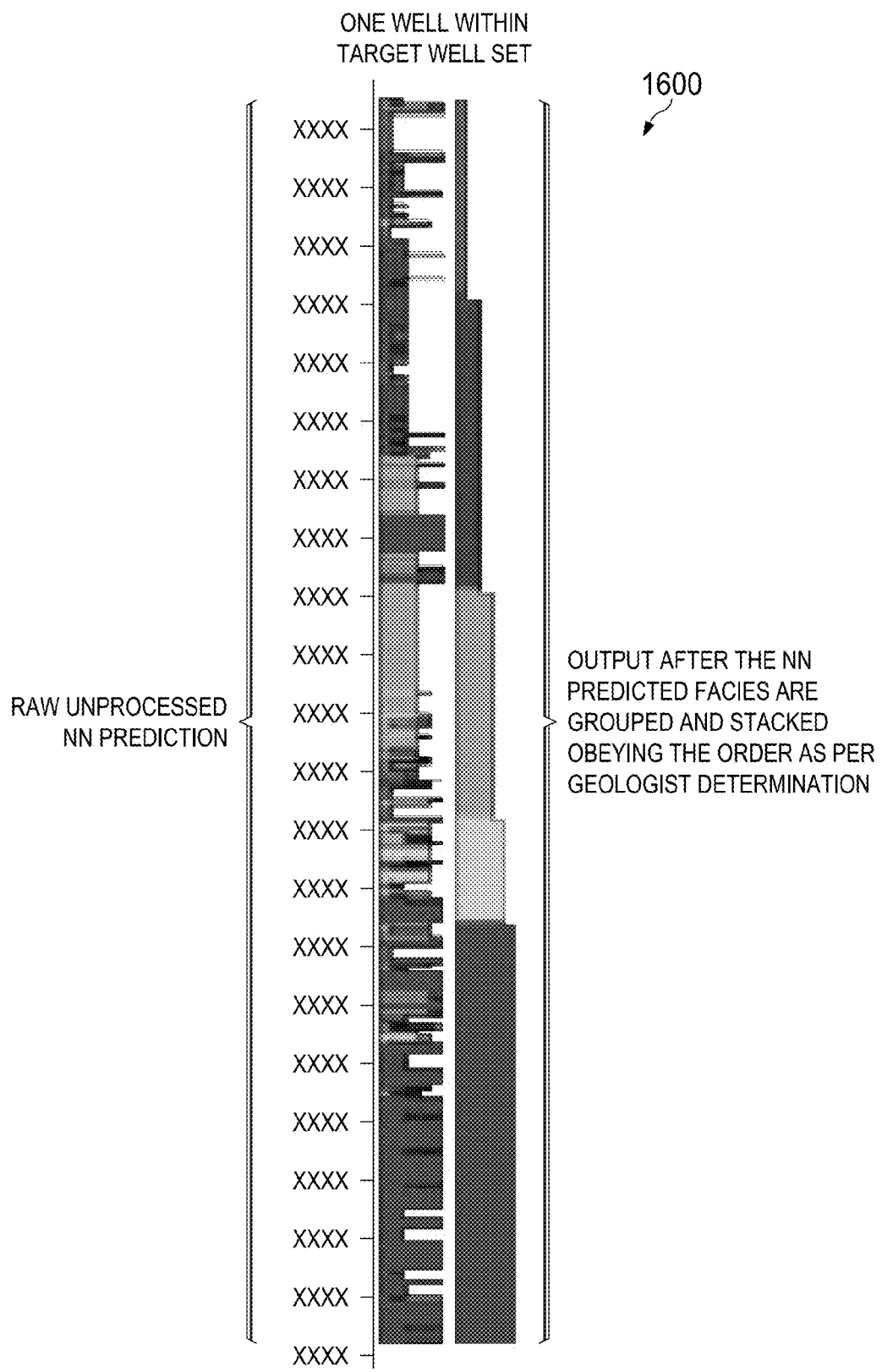
FIG. 16 illustrates before-and-after grouping and stacking of like-with-like facies according to an implementation

For example, FIG. 15 illustrates the difference 1500 between a human prediction 1502 from well logs of training wells and NN-predicted facies 1504 of a target well according to an implementation. Like-with-like facies are grouped together from the NN prediction. In some implementations, the concept of grouping is simply to sort by color (e.g., red color predicted by NN will be grouped together with all the other reds and will appear near the bottom of the track, obeying the ordering of the finer zones (1502) as the geoscientist has determined. The same is performed with other colors (e.g., greens will appear groups toward the middle, etc.). Note each color represents a finer zone as geologist has determined on training wells. FIG. 16 illustrates before-and-after 1600 grouping and stacking of like-with-like facies according to an implementation. From 606, method 600a proceeds to 608.

At 608, a depth-ratio of zones after grouping is determined. A depth ratio of each facies zone is obtained and noted for later use in the process. In some implementations, each depth ratio is calculated by taking the mentioned depth over the depth of all finer-zones (e.g., illustrated pink, blue, green, lime-green and red). Referring back to FIG. 9, FIG. 9 illustrates an example of how a depth ratio of a finer zone is calculated according to an implementation. For example, the pink colored finer-zone 802a has a zone depth of 4, therefore the depth-ratio of the pink facies zone is 0.13 (i.e., 4/30). The depth ratio of zones is used to fill in zone without dominant facies. The depth ratio learned from each well in the target wells is stored in a computer memory. From 608, method 600a proceeds to FIG. 6C (648).

From 112, method 100 proceeds to objective 114. At 114, in some implementations, the determined well markers/positions that bind finer zones are used, among other things consistent with this disclosure, to model reservoir formations and lithofacies distribution according to an implementation.

Figure 17:
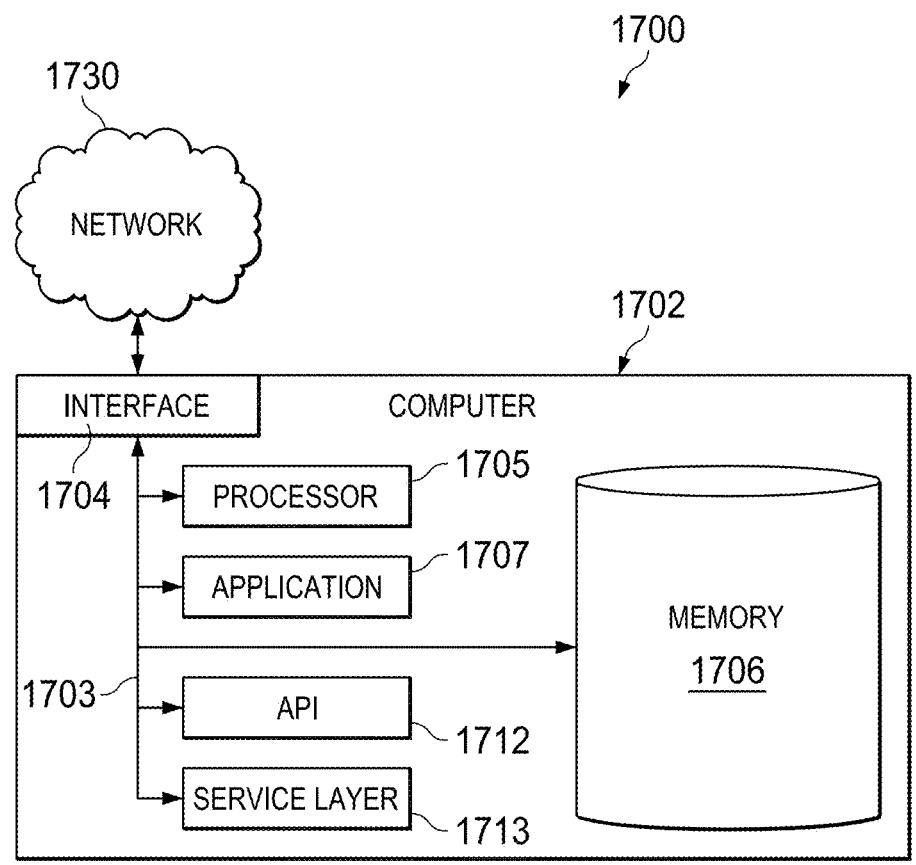
FIG. 17 is a block diagram illustrating an exemplary distributed computer system (EDCS) used to predict well markers and to model reservoir formations and lithofacies distribution according to an implementation.

Turning to FIG. 17, FIG. 17 is a block diagram illustrating an exemplary distributed computer system (EDCS) 1700 for predicting well markers according to an implementation. In some implementations, the EDCS 1700 includes a computer 1702 and a network 1730. In other implementations multiple computers and/or networks can work together to perform the above-described method(s).

The illustrated computer 1702 is intended to encompass a computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. The computer 1702 may comprise a computer that includes an input device, such as a keypad, keyboard, touch screen, or other device (not illustrated) that can accept user information, and an output device (not illustrated) that conveys information associated with the operation of the computer 1702, including digital data, visual and/or audio information, or a user interface.

In some implementations, the computer 1702 can serve as a client and/or a server. In typical implementations, the computer 1702 acts as either a parallel processing node 102, host for a software agent 304, and/or a host for an executing application 1707, and/or other application, process, method, etc. consistent with this disclosure (even if not illustrated). The illustrated computer 1702 is communicably coupled with a network 1730. In some implementations, one or more components of the computer 1702 may be configured to operate within a parallel-processing and/or cloud-computing-based environment. Implementations of the computer 1702 can also communicate using message passing interface (MPI) or other interface over network 1730.

At a high level, the computer 1702 is an electronic computing device operable to receive, transmit, process, store, or manage data and information associated with predicting well markers according to an implementation. According to some implementations, the computer 1702 may also include or be communicably coupled with a simulation server, application server, e-mail server, web server, caching server, streaming data server, business intelligence (BI) server, and/or other server.

The computer 1702 can receive requests over network 1730 from an application 1707 (e.g., executing on another computer 1702) and respond to the received requests by processing the said requests in an appropriate software application 1707. In addition, requests may also be sent to the computer 1702 from internal users (e.g., from a command console or by other appropriate access method), external or third-parties, other automated applications, as well as any other appropriate entities, individuals, systems, or computers.

Each of the components of the computer 1702 can communicate using a system bus 1703. In some implementations, any and/or all the components of the computer 1702, both hardware and/or software, may interface with each other and/or the interface 1704 over the system bus 1703 using an application programming interface (API) 1712 and/or a service layer 1713. The API 1712 may include specifications for routines, data structures, and object classes. The API 1712 may be either computer-language independent or dependent and refer to a complete interface, a single function, or even a set of APIs. The service layer 1713 provides software services to the computer 1702 and/or system of which the computer 1702 is a part. The functionality of the computer 1702 may be accessible for all service consumers using this service layer. Software services, such as those provided by the service layer 1713, provide reusable, defined business functionalities through a defined interface. For example, the interface may be software written in JAVA, C++, or other suitable language providing data in extensible markup language (XML) format or other suitable format. While illustrated as an integrated component of the computer 1702, alternative implementations may illustrate the API 1712 and/or the service layer 1713 as stand-alone components in relation to other components of the computer 1702. Moreover, any or all parts of the API 1712 and/or the service layer 1713 may be implemented as child or sub-modules of another software module, enterprise application, or hardware module without departing from the scope of this disclosure.

The computer 1702 includes an interface 1704. Although illustrated as a single interface 1704 in FIG. 17, two or more interfaces 1704 may be used according to particular needs, desires, or particular implementations of the computer 1702. The interface 1704 is used by the computer 1702 for communicating with other systems in a distributed environment—including a parallel processing environment—connected to the network 1730 (whether illustrated or not). Generally, the interface 1704 comprises logic encoded in software and/or hardware in a suitable combination and operable to communicate with the network 1730. More specifically, the interface 1704 may comprise software supporting one or more communication protocols associated with communications over network 1730.

The computer 1702 includes a processor 1705. Although illustrated as a single processor 1705 in FIG. 17, two or more processors may be used according to particular needs, desires, or particular implementations of the computer 1702. Generally, the processor 1705 executes instructions and manipulates data to perform the operations of the computer 1702. Specifically, the processor 1705 executes the functionality required for predicting well markers according to an implementation.

The computer 1702 also includes a memory 1706 that holds data for the computer 1702 and/or other components of a system of which the computer is a part. Although illustrated as a single memory 1706 in FIG. 17, two or more memories may be used according to particular needs, desires, or particular implementations of the computer 1702. While memory 1706 is illustrated as an integral component of the computer 1702, in alternative implementations, memory 1706 can be external to the computer 1702. In some implementations, memory 1706 can hold and/or reference one or more of, any data described with respect to method 600 (e.g., coverage scores, sameness scores, depth ratios, etc.) and/or any other appropriate data consistent with this disclosure.

The application 1707 is an algorithmic software engine providing functionality according to particular needs, desires, or particular implementations of the computer 1702 and/or a system of which the computer 1702 is a part, particularly with respect to functionality required to, for some implementations, to predict well markers. For example, application 1707 can serve as (or a portion of) a prediction engine, iteration engine, comparison engine, grouping/stacking engine, simulation/simulator, parallel processing node, system administrator, and/or other application consistent with this disclosure (whether illustrated or not)—including one or more engines to model reservoir formations and/or lithofacies distribution. Although illustrated as a single application 1707, the application 1707 may be implemented as multiple applications 1707 on the computer 1702. In addition, although illustrated as integral to the computer 1702, in alternative implementations, the application 1707 can be external to and execute apart from the computer 1702.

There may be any number of computers 1702 associated with a computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 1702, or that one user/process may use multiple computers 1702.

The disclosure has to this point been described primarily with respect to using the facies prediction output of an NN-model, in which training of the predictive model is confined within a member of formation (coarse zone). This zone is a lateral slice of the earth bounded by a top-surface and a bottom surface which has been human-predetermined. However, the described method can also be applied on the NN-predicted facies, where the NN-model is run unsupervised. In the case of unsupervised learning, the NN-model predicts all facies for the entire trajectory of the target wells, from surface to bottom hole; this means that the coarse zone locations of the target wells do not need to be determined by human. The unsupervised learning variation of the NN-predictive model, also trains from multiple logs of training wells and output as many facies types as the number of objective (facies) parameter specified for the model. After the learning process, the unsupervised NN-predictive model is then applied on target wells.

In the case of the alternative application, an implementation of the present disclosure could be used to detect the location of dominant facies zone given a facies log along the well trajectory from surface to bottom-of-hole. To achieve this involves, in some implementations, running the NN-predictive model twice. The first run is confined within a member of a formation (e.g., a coarse zone). The method of the present disclosure is applied on the NN-predicted facies output, in order to detect the presence of dominant-facies zones within the given member of formation (e.g., coarse zone). The presence of dominant zones and the lithostratigraphic zone ordering within a member-of-formation then are used to detect the depth location of the equivalent dominant facies zones within the target wells. The NN-facies output (e.g., predicted using the unsupervised method on the target wells) is used as the input for the dominant zone prediction steps.

The alternative method is, by-and-large, similar to the preferred embodiment described above. The present invention dominant-facie zone detection mechanism is applied on the facie prediction output from the first run of the NN-predictive models (supervised). The second run of NN-predictive model involves unsupervised learning, which is configured to output as many class (facies) as the desired number of lithostratigraphic units (finer zones). Note that the lithostratigraphic units have been previously mentioned as human-determined on training wells for the first run of the NN-predictive model.

One of the learning outcomes of the first run is the detection of lithostratigraphic units with dominant facies. An iterative search process along the target well trajectory is then performed on the target well. For a window of observation covering a depth range, fuzzy logic employing calculation of sameness and coverage scores is applied between the dominant facies depth range of the first run and the lateral slice pertaining to the target wells. The calculation is performed iteratively along the target well trajectory at one or more WOO—either having constant depth range or an incrementally enlarged-depth range. As a WOO slides upwards towards the well surface point, the total of sameness and coverage scores are computed and memorized for each movement upwards. The highest scores nearest to the mean scores will be the result of the prediction of the most likely depth position of this dominant facie zone within the target wells.

In some implementations, a summary of the above-described concepts and method of predicting well markers of reservoir(s) within a hydrocarbon-bearing field, includes:

a. Drilling multiple wells in a hydrocarbon-bearing field.
b. Capturing a suite of well logs in all the wells
c. Separating the well log data into two sets: 1) representing training well data (minor set) and 2) representing target well data (major set).
d. The well log data, as well as a geoscientist determination of a depth location of a member of formation (coarse zone) and a depth location of lithostratigraphic units (finer zones) on training well data are fitted into an artificial neural network (NN) model for facies prediction within members of formation (coarse zones). The training process uses only a minor subset of the entire wells drilled in the hydrocarbon-bearing field.
e. Using the NN-predicted facies output from the training wells to extract the characteristics of lithostratigraphic units (finer zones) within a reservoir or a member of formation (coarse zone). Characteristics of interest are the presence of a dominant-facies zone, and statistical measures of coverage score, sameness score, and/or ratio of depth of the lithostratigraphic unit. The extraction of these characteristics is performed on a minor subset of the entire wells drilled in the field (i.e., training wells).
f. Using the 'trained' NN-predictive model to predict facies on the target wells.
g. Applying the above described method (e.g., method 600) to predict the accurate depth location of dominant facie zones and minor facie zones in the target wells. The facies prediction outcome of NN-predictive model of the target wells is used as input to the prediction. The described method includes one or more of the following:

The extraction of statistical characteristics of a lithofacies zone from the NN-predicted output of the training wells.

Using the NN-predicted facies of the target wells to perform sorting and grouping of like-with-like facie to represent a lithostratigraphic (finer) zone. Use the grouped facie as the initial location guesstimate of the lithostratigraphic zones.

The employment of iterative movement techniques such as sliding up and down on a window-of-observation, whereby the size of the window is kept constant, enlarged or shrunk. As the movement is made and the window of observation changes size, compute the sameness and coverage scores. This computation is done between the NN-predicted facies outcome and the facie which is assumed to be 100% populating the window of observation. The computed scores for each move and window size are memorized.

A proprietary fuzzy comparator to calculate the degree-of-sameness through sameness and coverage scores between two windows of observation, namely the raw NN-predicted facies and the grouped and sorted facies.

A facies distribution coverage calculator to measure if a facie is distributed densely or sparsely within a window of observation.

To use statistical mean sameness and coverage scores of each lithostratigraphic zone from the minority wells to control the iterative movement techniques and fuzzy comparator behavior in the goal of determining the most accurate position of dominant-facie zones within the target wells.

The application of ratio-of-depth to predict the depth location of lithostratigraphic zones with no-dominant facie.

To use top and bottom points of the predicted lithostratigraphic zones location, as well markers. These markers become input into the construction of top and bottom surface planes that makes up an Oil and Gas reservoir model structure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a co-processor (e.g., a graphics/visual processing unit (GPU/VPU)), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for predicting well markers, comprising:
   separating neural-network (NN)-predicted facies output associated with a plurality of wells into two sets, a first set of NN-predicted facies output of training wells and a second set of NN-predicted facies output of target wells;
   calculating, for each training well of the plurality of wells, a sameness score between zones of NN-predicted facies output and finer zones, wherein the finer zones are human-identified lithostratigraphic units;
calculating a mean sameness score for the finer zones for all training wells;
identifying finer zones with a mean sameness score greater than a threshold value as dominant facies zones; and
iterating, by a hardware processor, over each target well to calculate a top and a start depth position and an end depth position of each dominant facies zone determined based upon the NN-predicted facies output of the target well.

2. The method of claim 1, further comprising, for the second set:
grouping and stacking scattered interbedded facies into finer zones for target wells; and
determining depth ratios of the finer zones following the grouping.

3. The method of claim 1, further comprising:
calculating a mean coverage score for the finer zones for all training wells; and
calculating a mean of proportion ratio for finer zones for all training wells.

4. The method of claim 1, further comprising, for finer zones with a mean sameness score less than or equal to the threshold value, grouping and stacking scattered interbedded facies into finer zones for target wells.

5. The method of claim 1, further comprising:
feeding dominant facies detection statistics aspects for target well zones and well markers prediction into a memory; and
receiving dominant facies identified from the training wells and statistical characteristics of all finer zones in preparation for processing the target wells.

6. The method of claim 2, further comprising calculating a sameness score and a coverage score between NN-predicted facies output and grouped and stacked finer zones for each target well, the grouped and stacked finer zones for each target well obeying a stacking order of finer zones corresponding to the training wells.

7. The method of claim 6, further comprising moving a window of observation (WOO) to calculate a sameness score for each depth range associated with the NN-predicted facies output and grouped and stacked finer zones for each target well.

8. The method of claim 2, further comprising determining a depth for remaining slots above, in-between, and below the calculated start depth positions and end depth positions of each dominant facies zone for each target well.

9. The method of claim 8, further comprising, filling in zones in available slots above, below, and in-between each dominant facies zone for each target well, the filling of the zones proportional to the determined depth ratios of the finer zones.

10. A non-transitory, computer-readable medium storing computer-readable instructions for predicting well markers, the instructions executable by a hardware processor and configured to:
separate neural-network (NN)-predicted facies output associated with a plurality of wells into two sets, a first set of NN-predicted facies output of training wells and a second set of NN-predicted facies output of target wells;
calculate, for each training well of the plurality of wells, a sameness score between zones of NN-predicted facies output and finer zones, wherein the finer zones are human-identified lithostratigraphic units;
calculate a mean sameness score for the finer zones for all training wells;
identify finer zones with a mean sameness score greater than a threshold value as dominant facies zones; and
iterate, by a hardware processor, over each target well to calculate a top and a start depth position and an end depth position of each dominant facies zone determined based upon the NN-predicted facies output of the target well.

11. The medium of claim 10, further comprising, for the second set, instructions to:
group and stack scattered interbedded facies into finer zones for target wells;
determine depth ratios of the finer zones following the grouping;
calculate a sameness score and a coverage score between NN-predicted facies output and grouped and stacked finer zones for each target well, the grouped and stacked finer zones for each target well obeying a stacking order of finer zones corresponding to the training wells; and
move a window of observation (WOO) to calculate a sameness score for each depth range associated with the NN-predicted facies output and grouped and stacked finer zones for each target well.

12. The medium of claim 10, further comprising instructions to:
calculate a mean coverage score for the finer zones for all training wells; and
calculate a mean of proportion ratio for finer zones for all training wells.

13. The medium of claim 10, further comprising, for finer zones with a mean sameness score less than or equal to the threshold value, instructions to group and stack scattered interbedded facies into finer zones for target wells.

14. The medium of claim 10, further comprising instructions to:
feed dominant facies detection statistics aspects for target well zones and well markers prediction into a memory; and receive dominant facies identified from the training wells and statistical characteristics of all finer zones in preparation for processing the target wells.

15. The medium of claim 11, further comprising instructions to:
determine a depth for remaining slots above, in-between, and below the calculated start depth positions and end depth positions of each dominant facies zone for each target well; and
fill in zones in available slots above, below, and in-between each dominant facies zone for each target well, the filling of the zones proportional to the determined depth ratios of the finer zones.

16. A computer-implemented system for predicting well markers, comprising:
at least one hardware processor interoperably coupled with a memory storage and configured to:
separate neural-network (NN)-predicted facies output associated with a plurality of wells into two sets, a first set of NN-predicted facies output of training wells and a second set of NN-predicted facies output of target wells;
calculate, for each training well of the plurality of wells, a sameness score between zones of NN-predicted facies output and finer zones, wherein the finer zones are human-identified lithostratigraphic units;
calculate a mean sameness score for the finer zones for all training wells;

identify finer zones with a mean sameness score greater than a threshold value as dominant facies zones; and iterate, by a hardware processor, over each target well to calculate a top and a start depth position and an end depth position of each dominant facies zone determined based upon the NN-predicted facies output of the target well.

17. The system of claim 16, further configured, for the second set, to:

group and stack scattered interbedded facies into finer zones for target wells;

determine depth ratios of the finer zones following the grouping;

calculate a sameness score and a coverage score between NN-predicted facies output and grouped and stacked finer zones for each target well, the grouped and stacked finer zones for each target well obeying a stacking order of finer zones corresponding to the training wells;

move a window of observation (WOO) to calculate a sameness score for each depth range associated with the NN-predicted facies output and grouped and stacked finer zones for each target well;

determine a depth for remaining slots above, in-between, and below the calculated start depth positions and end depth positions of each dominant facies zone for each target well; and fill in zones in available slots above, below, and in-between each dominant facies zone for each target well, the filling of the zones proportional to the determined depth ratios of the finer zones.

18. The system of claim 16, further configured to:

calculate a mean coverage score for the finer zones for all training wells; and calculate a mean of proportion ratio for finer zones for all training wells.

19. The system of claim 16, further configured, for finer zones with a mean sameness score less than or equal to the threshold value, to group and stack scattered interbedded facies into finer zones for target wells.

20. The system of claim 16, further configured to:

feed dominant facies detection statistics aspects for target well zones and well markers prediction into a memory; and receive dominant facies identified from the training wells and statistical characteristics of all finer zones in preparation for processing the target wells.

* * * * *